(12) United States Patent
Chauhan et al.

(10) Patent No.: US 7,739,138 B2
(45) Date of Patent: Jun. 15, 2010

(54) AUTOMATED UTILITY SUPPLY MANAGEMENT SYSTEM INTEGRATING DATA SOURCES INCLUDING GEOGRAPHIC INFORMATION SYSTEMS (GIS) DATA

(75) Inventors: Swatantar K. Chauhan, Hampton Cove, AL (US); Michael A. Guman, Harvest, AL (US); Christopher M. Palmer, Huntsville, AL (US); Frank Wilson, Madison, AL (US); Adrian I. O'Neill, Huntsville, AL (US); Jason Dinkins, Hartselle, AL (US); David Sanders, Madison, AL (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 10/440,089

(22) Filed: May 19, 2003

(65) Prior Publication Data

US 2004/0236620 A1 Nov. 25, 2004

(51) Int. Cl.
G06F 9/46 (2006.01)
(52) U.S. Cl. ...................... 705/9; 705/7; 705/8
(58) Field of Classification Search .............. 705/1, 705/7, 8, 9; 700/286, 291–5, 297; 455/405
See application file for complete search history.

(56) References Cited

U.S. PATENT DOCUMENTS

| | | | | |
|---|---|---|---|---|
| 5,101,352 A | * | 3/1992 | Rembert ....................... 705/8 |
| 5,189,606 A | * | 2/1993 | Burns et al. ................... 705/10 |
| 5,434,775 A | * | 7/1995 | Sims et al. ..................... 705/8 |
| 5,483,462 A | * | 1/1996 | Chiang ....................... 700/293 |
| 5,513,090 A | * | 4/1996 | Bhattacharya et al. ........ 363/40 |
| 5,568,399 A | * | 10/1996 | Sumic ........................ 700/293 |
| 6,088,688 A | * | 7/2000 | Crooks et al. ................. 705/412 |
| 6,259,972 B1 | * | 7/2001 | Sumic et al. ................. 700/286 |
| 6,393,481 B1 | * | 5/2002 | Deo et al. ..................... 709/224 |
| 6,549,880 B1 | * | 4/2003 | Willoughby et al. .......... 703/13 |
| 6,751,553 B2 | * | 6/2004 | Young et al. ................... 702/5 |
| 2002/0026394 A1 | * | 2/2002 | Savage et al. ................ 705/34 |
| 2002/0087220 A1 | | 7/2002 | Tveit et al. |
| 2002/0094799 A1 | * | 7/2002 | Elliott et al. ................ 455/405 |

(Continued)

OTHER PUBLICATIONS

D.J. Dolezilek and L.M. Ayers, "Using Dynamic Real-Time Substation Information to Reinvent Asset Management", Institution of Electrical Engineers, Dialog File, copyright 2002.

(Continued)

*Primary Examiner*—Beth Van Doren
*Assistant Examiner*—Mark A Fleischer

(57) ABSTRACT

An automated management system for managing data, outage repair, load switching, job workflow and crew dispatching, crew workflow, installation, maintenance and restoration of utility services by integrating geographic information systems (GIS) data with many other data sources so as to gather, transform, manipulate, analyze, and produce desired information for continuously supplying utility and relevant services. The data sources include customer information systems (CIS) and billing data, interactive voice recognition (IVR) call management data, supervisory control and data acquisition (SCADA), mobile crew management (MCM) data, automatic meter reading (AMR) data, automated vehicle location (AVL) data, engineering analysis data supported by 3rd party software packages (such as load monitoring and balancing), etc. In particular, the system allows an on-site engineer to retrieve data (ex. field maps, work orders, codes) or enter, via a portable device, inspection data (ex. such as poles or underground facilities, code violations).

24 Claims, 34 Drawing Sheets

U.S. PATENT DOCUMENTS

| | | | |
|---|---|---|---|
| 2002/0111842 A1* | 8/2002 | Miles | 705/8 |
| 2002/0111959 A1* | 8/2002 | Ching et al. | 707/201 |
| 2002/0136165 A1* | 9/2002 | Ady et al. | 370/241 |
| 2002/0184235 A1* | 12/2002 | Young et al. | 707/104.1 |
| 2002/0198627 A1 | 12/2002 | Nasman et al. | |
| 2003/0028351 A1 | 2/2003 | Billet et al. | |
| 2003/0083786 A1* | 5/2003 | Pietrowicz et al. | 700/286 |
| 2003/0130820 A1* | 7/2003 | Lane, III | 702/184 |
| 2004/0024483 A1* | 2/2004 | Holcombe | 700/122 |
| 2004/0061616 A1* | 4/2004 | Fischer et al. | 340/657 |
| 2004/0162811 A1* | 8/2004 | Wetzer et al. | 707/2 |

OTHER PUBLICATIONS

M.S. Moore, S. Monemi, Jianfeng Wang, J. Marble and S. Jones, "Diagnostics and Integration in Electric Utilities", Institution of Electrical Engineers, Dialog File, copyright 2000.

S. Kearney, "How Outage Management Systems Can Improve Customer Service", Institution of Electrical Engineers, Dialog File, Copyright 1998.

N. Guven, N. Ozay and E. Tunah, "GIS Based Outage Analysis System for Electric Distribution Networks", Institution of Electrical Engineers, Dialog File, copyright 1996.

"Sumter Electric Cooperative Selects GE Network Solutions to Implement an Integrated Network Management System", Business wire, Institution of Electrical Engineers, Dialog File, copyright 2001.

"CES International, Utility-Partners, and ESRI Canada Partner for Implementation; Nova Scotia Power to Acquire Advanced GIS for Outage Management, Computer-Aided Scheduling, and More", Business wire, Institution of Electrical Engineers, Dialog File, copyright 2000.

Steve Kearney, "Outage Management Systems Can Improve Customer Service", GITA 1999.

"Outage Management Systems Can Improve Customer Service", GITA 1999.

"What is GRM? Geospatial Resource Management (GRM)", 2002 Intergraph Utilities & Communications.

Outage and Worforce Management:, InService Overview.

"Outage Management", Cognicase.

"What is a uaField?", pp. 1-74.

\* cited by examiner

File Menu

| Find Records in CONDUCT | Find Records in WPIPE |
| --- | --- |
| Show CONDUCT in Bird's Eye | Show WPIPE in Bird's Eye |
| Remove CONDUCT From Bird's Eye | Remove WPIPE From Bird's Eye |
| Zoom to CONDUCT Extents | Zoom to WPIPE Extents |
| Count Records in CONDUCT | Count Records in WPIPE |
| Make CONDUCT the Active Theme | Make WPIPE the Active Theme |
| Set Max Threshold | Set Max Threshold |
| Set Min Threshold | Set Min Threshold |
| Clear Thresholds | Clear Thresholds |
| Calculate Default Thresholds | Calculate Default Thresholds |
| Change Symbology for CONDUCT | Change Symbology for WPIPE |
| Set Renderered Values for CONDUCT | Set Renderered Values for WPIPE |
| Reset Default Symbology for CONDUCT | Reset Default Symbology for WPIPE |
| Check Data Integrity for CONDUCT | Check Data Integrity for WPIPE |
| Remove CONDUCT From Map | Remove WPIPE From Map |
| Regenerate CONDUCT Shapefile | Regenerate WPIPE Shapefile |

Fig. 24

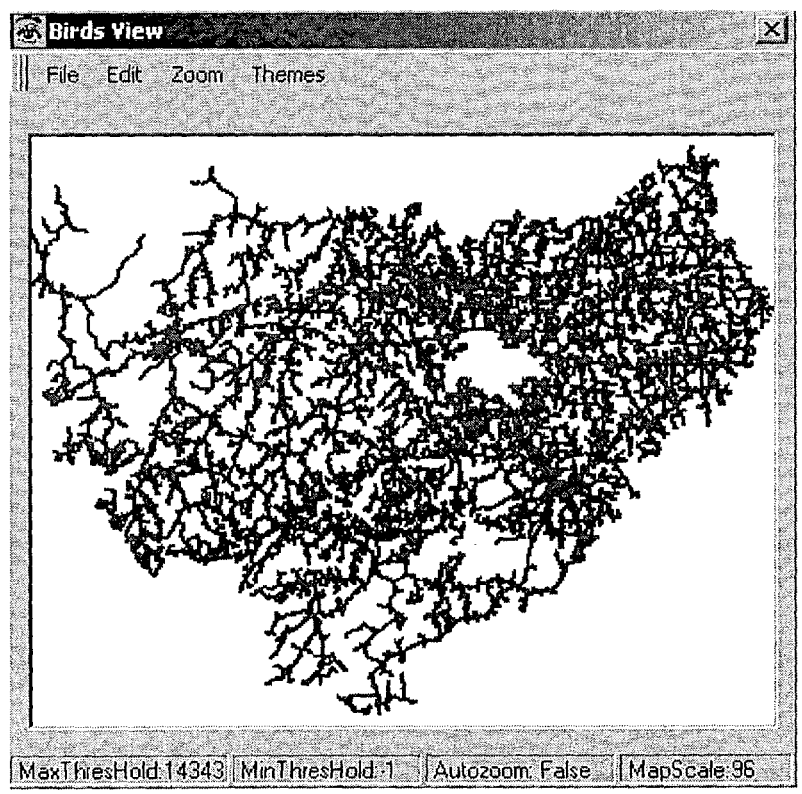

| | | Sketch Name | Sketch Description | Category | Submitting Machine | Submitting User ID |
|---|---|---|---|---|---|---|
| Edit | View | | | | | |
| | ✓ | NewService3 | Add new service at | General Notes | PDDEMO3 | uaserver |
| | | Test12 | test sketch | Inspection | NTBUILD2 | mguman |
| | | NewSERVICE8 | Adding a new servic | General Notes | PDDEMO3 | uaserver |
| | ✓ | NewService6 | Add new service at 1 | General Notes | PDDEMO3 | uaserver |
| | ✓ | Test1 | Test Sketch for new | General Notes | PDDEMO3 | uaserver |
| | ✓ | NewService5 | Add service at 100 | General Notes | PDDEMO3 | uaserver |
| | ✓ | InspectionReport | Inspection of lines or | General Notes | PDDEMO3 | uaserver |
| | | NewService2 | Add service at 122 | General Notes | PDDEMO3 | uaserver |
| | | NewService32 | Add New | General Notes | PDDEMO3 | uaserver |
| | | test | test | Maintenance | NTBUILD2 | mguman |

Fig. 27

| Column Name | Data Type | Length |
|---|---|---|
| Tablename | varchar | 50 |
| FieldName | varchar | 50 |
| MapTips | int | 4 |
| ShapeFieldName | varchar | 15 |
| FieldDescription | varchar | 255 |
| DisplayLabel | varchar | 50 |
| Dataset | varchar | 22 |
| DisplayControl | varchar | 50 |
| LUTName | varchar | 50 |
| Category | varchar | 50 |
| DefaultValue | varchar | 255 |
| Mask | varchar | 100 |
| SortOrder | int | 4 |
| Required | bit | 1 |
| Editable | varchar | 255 |
| Searchable | varchar | 255 |
| Viewable | varchar | 255 |
| CustomEdit | tinyint | 1 |
| URL | bit | 1 |
| Exportable | bit | 1 |

Figure 47 – Database Dictionary (DBD) Schema

| FieldName | FieldType | FieldPrecision | FieldScale | FieldDefinedLength | Dataset |
|---|---|---|---|---|---|
| PRIKEY | 3 | <NULL> | <NULL> | <NULL> | All |
| s_Left | 131 | 28 | 15 | <NULL> | All |
| s_Right | 131 | 28 | 15 | <NULL> | All |
| s_Top | 131 | 28 | 15 | <NULL> | All |
| s_Bottom | 131 | 28 | 15 | <NULL> | All |
| SHAPE | 205 | <NULL> | <NULL> | <NULL> | All |
| s_LastModifiedTime | 135 | <NULL> | <NULL> | <NULL> | All |
| s_LocationID | 3 | <NULL> | <NULL> | <NULL> | All |
| uaWO | 3 | <NULL> | <NULL> | <NULL> | All |
| s_Existing | 200 | <NULL> | <NULL> | 1 | Proposed |
| s_Retired | 11 | <NULL> | <NULL> | <NULL> | All |
| s_Proposed | 200 | <NULL> | <NULL> | 1 | Working |
| s_Fnode | 3 | <NULL> | <NULL> | <NULL> | Trace |
| s_Tnode | 3 | <NULL> | <NULL> | <NULL> | Trace |
| s_uaAction | 200 | <NULL> | <NULL> | 1 | Working |
| s_uaAction | 200 | <NULL> | <NULL> | 1 | Proposed |
| s_Existing | 200 | <NULL> | <NULL> | 1 | Working |

Figure 48 – UtilityCenter Required System Fields for Utility Theme Tables

| Column Name | Data Type | Length |
|---|---|---|
| OWNER | varchar | 4 |
| HEIGHT | int | 4 |
| CLASS_R | varchar | 1 |
| MATERIAL | varchar | 10 |
| ATTACHMENT | varchar | 10 |
| DOB | int | 4 |
| NUM_CKT | int | 4 |
| RISER | varchar | 1 |
| COMMENT | varchar | 30 |
| ACCESIBLE | varchar | 1 |
| TRANSCKTS | varchar | 1 |
| UCID | int | 4 |
| UNITS | varchar | 100 |
| CONDUCTID | int | 4 |
| Retired | bit | 1 |
| DISTRICT | varchar | 30 |

Figure 49 – Sample Customized Fields for a POLE Theme in Existing Database

| Header Type | TableName | AliasMenu | Schedulable | Permissions | CusNumField Name |
|---|---|---|---|---|---|
| 1 | WOH_MAP_EDIT | Map Edit Session | 0 | .MAP. | WONumber |
| 2 | WOH_GAS | Gas Service | 1 | .GSS. | WONumber |
| 3 | WOH_ELECTRIC1 | Standard Electric Work Order | 1 | .ELS1. | WONumber |
| 4 | WOH_ELECTRIC2 | Special Electric Service Order | 1 | .ELS2. | WONumber |
| 5 | WOH_WATER | Water Service | 1 | .W. | WONumber |
| 6 | WOH_ELECTRIC_SEDC | Electric Work Order for SEDC | 1 | .ELSEDC. | WONumber |

Figure 50 – Sample WOH_List Table (List of work order tables and descriptive metadata)

| Schedulable | WO_Name | Submitted Machine | uaWOOrigin | Version | Comments | Header Type | uaWO |
|---|---|---|---|---|---|---|---|
| 0 | sql | DELL03 | uaserver | 1.0 | | 3 | -1909890525 |
| 0 | a1 | MGUMAN | mguman | 1.1 | | 3 | -1837689740 |
| 0 | KathrynHelen Lewis | DELL05 | uaserver | 1.0 | | 1 | -1811735060 |
| 0 | fhfh | DELL03 | uaserver | 2.4 | | 1 | -1741460608 |
| 0 | map edit test2 | DELL03 | uaserver | 1.4 | | 1 | -1573030622 |
| 0 | Dustin3 | DELL03 | uaserver | 1.2 | | 1 | -1524965966 |
| 0 | mes44 | MGUMAN | mguman | 1.0 | | 1 | -1387757419 |
| 0 | Dustin 5 | DELL03 | uaserver | 1.0 | | 1 | -1354071332 |
| 0 | map edit back again | DELL03 | uaserver | 1.0 | | 1 | -1333905049 |

Figure 51 – Sample WOH_Control Table (Cross reference of actual work orders to work order header types)

| Column Name | Data Type | Length |
|---|---|---|
| GasCustomerField | varchar | 50 |
| ServiceOrder | bit | 1 |
| ServiceComplete | bit | 1 |
| MeterInstalled | bit | 1 |
| gendate | datetime | 8 |
| genCustomerAddress1 | varchar | 50 |
| genCustomerAddress2 | varchar | 50 |
| CompletionReq | varchar | 50 |
| genProjectName | varchar | 50 |
| genCustomerAddress3 | varchar | 50 |
| Activity | varchar | 50 |
| uaWO | int | 4 |
| rowguid | uniqueidentifier | 16 |

Figure 52 – Sample Work Order Header Table Schema

Report: UAI Outage Indices
POM: Start Time: 7/1/2002 12:01:00 AM, End Time: 7/31/2002 12:00:00 PM
POM: Start Time: 7/1/2002 12:01:00 AM, End Time: 7/31/2002 12:00:00 PM Date: 5/9/2003 10:05:28 AM

| Substation | Feeder | CustCount | OutageCount | TroubleCallCount | AffCustCount | Caidi | Caifi | Saidi | Saifi |
|---|---|---|---|---|---|---|---|---|---|
| GREENCOVE | GC2 | 1212 | 22 | 80 | 395 | 208.7772 | 1 | 68.0421 | 0.3259 |
| GREENCOVE | GC3 | 1279 | 22 | 126 | 1666 | 178.7029 | 1 | 232.7748 | 1.3026 |
| GREENCOVE | SS Total | 2491 | 44 | 206 | 2061 | 184.4668 | 1 | 152.6238 | 0.8274 |

Report: UAI Outage Indices
POM: Start Time: 7/1/2002 12:01:00 AM, End Time: 7/31/2002 12:00:00 PM
POM: Start Time: 7/1/2002 12:01:00 AM, End Time: 7/31/2002 12:00:00 PM Date: 5/9/2003 10:11:10 AM

| Substation | Feeder | CustCount | OutageCount | TroubleCallCount | AffCustCount | Caidi | Caifi | Saidi | Saifi |
|---|---|---|---|---|---|---|---|---|---|
| KS NORTH | KH1 | 2478 | 28 | 109 | 1067 | 171.7994 | 1 | 73.975 | 0.4306 |
| KS NORTH | KH2 | 1770 | 20 | 214 | 413 | 90.7264 | 1 | 21.1695 | 0.2333 |
| KS NORTH | SS Total | 4248 | 48 | 323 | 1480 | 149.1757 | 1 | 51.9727 | 0.3484 |
| KS SOUTH | KH3 | 1250 | 11 | 39 | 217 | 80.2396 | 1 | 13.9296 | 0.1736 |
| KS SOUTH | KH4 | 1772 | 12 | 137 | 2226 | 37.0737 | 1 | 46.5722 | 1.2562 |
| KS SOUTH | SS Total | 3022 | 23 | 176 | 2443 | 40.9079 | 1 | 33.0702 | 0.8084 |

Report: UAI Outage Indices
POM: Start Time: 7/1/2002 12:01:00 AM, End Time: 7/31/2002 12:00:00 PM
POM: Start Time: 7/1/2002 12:01:00 AM, End Time: 7/31/2002 12:00:00 PM Date: 5/9/2003 10:03:40 AM

| Substation | Feeder | CustCount | OutageCount | TroubleCallCount | AffCustCount | Caidi | Caifi | Saidi | Saifi |
|---|---|---|---|---|---|---|---|---|---|
| ARCHER | AC1 | 899 | 12 | 159 | 415 | 278.1976 | 1 | 128.4227 | 0.4616 |
| ARCHER | AC2 | 626 | 18 | 113 | 395 | 134.9975 | 1 | 85.1821 | 0.631 |
| ARCHER | AC3 | 539 | 2 | 59 | 373 | 118.6542 | 1 | 82.1113 | 0.692 |
| ARCHER | AC4 | 515 | 2 | 5 | 19 | 42.9474 | 1 | 1.5845 | 0.0369 |
| ARCHER | SS Total | 2579 | 34 | 336 | 1202 | 177.9118 | 1 | 82.9197 | 0.4661 |

Fig. 53

| Device ID | Type | Phase(s) | Arc ID |
|---|---|---|---|
| D1 | SBS | ABC | a |
| D2 | Recloser | ABC | d |
| D3 | Fuse | B | b |
| D4 | Fuse | B | c |
| D5 | Fuse | C | m |

Figure 55

| Customer ID | Arc ID | Phase |
|---|---|---|
| c1 | m | C |
| c2 | l | A |
| c3 | d | B |
| c4 | n | A |
| c5 | h | C |
| c6 | c | B |
| c7 | b | A |
| c8 | f | B |
| c9 | n | B |
| c10 | e | A |

Figure 56

| Arc | A Child | B Child | C Child | A Sib | B Sib | C Sib | A Parent | B Parent | C Parent | Source Arc | Phase | UD A | UD B | UD C |
|---|---|---|---|---|---|---|---|---|---|---|---|---|---|---|
| a | b | b | c | ∅ | ∅ | ∅ | ∅ | ∅ | ∅ | a | ABC | D1 | D1 | D2 |
| b | e | f | ∅ | d | c | d | a | a | ∅ | a | ABC | D1 | D3 | ∅ |
| c | ∅ | g | h | ∅ | d | d | ∅ | a | a | a | BC | ∅ | D4 | D1 |
| d | i | j | k | ∅ | ∅ | ∅ | a | a | a | a | ABC | D2 | D2 | D2 |
| e | ∅ | ∅ | ∅ | ∅ | ∅ | ∅ | b | b | ∅ | a | A | D1 | ∅ | ∅ |
| f | ∅ | ∅ | ∅ | ∅ | ∅ | ∅ | ∅ | c | ∅ | a | B | ∅ | D3 | ∅ |
| g | ∅ | ∅ | ∅ | ∅ | ∅ | ∅ | ∅ | ∅ | c | a | B | ∅ | D4 | ∅ |
| h | ∅ | ∅ | ∅ | ∅ | ∅ | ∅ | ∅ | ∅ | c | a | C | ∅ | ∅ | D1 |
| i | l | ∅ | ∅ | ∅ | ∅ | ∅ | d | ∅ | ∅ | a | A | D2 | ∅ | ∅ |
| j | ∅ | ∅ | ∅ | ∅ | ∅ | ∅ | ∅ | d | ∅ | a | B | ∅ | D2 | ∅ |
| k | ∅ | n | ∅ | ∅ | ∅ | ∅ | ∅ | ∅ | d | a | C | ∅ | ∅ | D2 |
| l | n | ∅ | ∅ | ∅ | ∅ | ∅ | i | ∅ | ∅ | a | A | D2 | ∅ | ∅ |
| m | ∅ | ∅ | n | ∅ | ∅ | ∅ | ∅ | j | k | a | C | ∅ | ∅ | D5 |
| n | ∅ | ∅ | ∅ | ∅ | ∅ | ∅ | l | ∅ | m | a | ABC | D2 | D2 | D5 |

Figure 59

AUTOMATED UTILITY SUPPLY MANAGEMENT SYSTEM INTEGRATING DATA SOURCES INCLUDING GEOGRAPHIC INFORMATION SYSTEMS (GIS) DATA

BACKGROUND OF THE INVENTION

1. Field of the Invention

The invention generally relates to an automated management system for managing data, outage repair, load switching, job workflow and crew dispatching, crew workflow, installation, maintenance and restoration of utility services by integrating geographic information systems (GIS) data with many other data sources so as to gather, transform, manipulate, analyze, and produce desired information for continuously supplying utility and relevant services. The data sources include customer information systems (CIS) and billing data, interactive voice recognition (IVR) call management data, supervisory control and data acquisition (SCADA), mobile crew management (MCM) data, automatic meter reading (AMR) data, automated vehicle location (AVL) data, engineering analysis data supported by $3^{rd}$ party software packages (such as load monitoring and balancing), etc. In particular, the system allows an on-site engineer to retrieve data (ex. field maps, work orders, codes) or enter, via a portable device, inspection data (ex. such as poles or underground facilities, code violations).

2. Description of the Related Art

Electric utilities companies improve their operations by implementing an Outage Management System (OMS) which has been developed with interfaces with SCADA, automatic meter reading systems (AMR), utility call centers, Customer Information Systems (CIS), and AM/FM/GIS systems to reduce the average outage restoration.

Supervisory control and data acquisition (SCADA) is a computer system for gathering and analyzing real time data. SCADA systems are used to monitor and control a plant or equipment in industries such as telecommunications, water and waste control, energy, oil and gas refining and transportation. A SCADA system gathers information, such as where a leak or break-down on a pipeline has occurred, transfers the information back to a central site, alerting the home station that the leak has occurred, carrying out necessary analysis and control, such as determining if the leak is critical, and displaying the information in a logical and organized fashion. SCADA systems can be relatively simple, such as one that monitors environmental conditions of a small office building, or incredibly complex, such as a system that monitors all the activity in a nuclear power plant or the activity of a municipal water system.

Geographic Information Systems (GIS) data play an important role in many operations, such as police and fire resources, phone, utilities, gas, cable TV, water, sewer installation and maintenance, to locate landmarks and hazards, plot destinations, and design emergency routes, etc. GIS has been integrated into automated mapping/facilities management (AM/FM) systems in many OMS systems.

Interactive voice response (IVR) is a telephony technology in which someone uses a touch-tone telephone to interact with a database to acquire information from or enter data into the database.

U.S. Pat. No. 6,259,972 shows a method for processing and disseminating utility outage information with response to the receipt of new data in the form of events. The outage data is mapped into a geographic information system and transmitted as selected by a subscriber by events, such as De-energized areas, Trouble calls, De-energized premise reported by automated meter reading (AMR) or by intelligent electronic device (IED), Work crew relocation reported, Supervisory control and data acquisition (SCADA) device operation reported, Work crew status change reported, Manual switch operation, Warning tagging (to notify others that work is being performed) reported, Grounding of the power line reported. It also offers customer services, such as Outage Alert and/or Outage Watch services. However, Pat'972 is directed toward a publisher/subscriber model with event driven updates, rather than providing the described functionality via direct server queries and merged updates to autonomous clients. In addition, Pat'972 lacks of sufficient teachings for implementing all these event reporting functions. For example, it merely mentions a "Query" menu 716, which allows tracing customer/power line/transformer upstream/downstream, displaying transformers downstream/trouble calls/outages/crews/device/line/facility/circuit-/GIS object, without providing implementation details. One of skill in the art would not be able to implement all the described functions based upon the disclosure of Pat'972. Another drawback of Pat'972 is its limited functionality. For example, a "Crew" menu only accepts commands for updating information pertaining to work crews, but not a full crew dispatching managing process to increase the effectiveness of outage restoration personnel.

An article by Steve Kearney titled "Outage management systems can improve customer service" published in 1999 http://www.gisdevelopment.net/proceedings/-gita/1999/os/os050.shtml, further suggests using OMS technology to improve customer service, such as Integrated Voice Response (IVR) messages to notify customers of an outage at a remote site. In particular, the system funnels data from all sources—Call Center, Crews, Dispatch, SCADA, AMR, IEDs—and establishes a common database (or "Information Bus") to push appropriate data back to the users is the main objective of the OMS. This allows the utility company to link CIS, with meter systems, Facilities and Work Management Systems, SCADA, Engineering Analysis, and AM/FM/GIS mapping systems to provide better informational exchange. The data is then compiles and sent to Call Centers, the dispatching personnel, crews, and/or Emergency Operations Centers, and then to the customers and News Media. However, the article lacks of sufficient teachings for implementing all these claimed functions, such as the interfaces for importing the various data. Neither does the article describe the deployment and mechanisms to update the OMS. In addition, its functionality does not include modification of the underlying model, such as switching and "what-if" scenarios or actual edits of underlying data, since it is based on a static model of the system.

U.S. patent application Ser. No. 5,568,399 provides a method and apparatus for determining the probable location of a fault causing a power outage in a power distribution system based on a power distribution grid. Using "fuzzy set" theory, the possibility that each protective device operated is calculated. The cumulative possibility that each protective device operated is then calculated by summing the possibilities associated with un-flagged reports for each protective device. This cumulative possibility is compared to a predetermined confidence threshold associated with each protective device. If the cumulative possibility that a given protective device operated is greater than the confidence threshold, a conclusion is reached that the protective device operated, and all reports that led to that conclusion are flagged so as not to contribute to future outage determinations. If the conclusion is subsequently rejected, the reports that led to the rejected conclusion are un-flagged so as to contribute to future outage determinations. However, it predicts with lengthy upstream network tracing.

U.S. patent application Ser. No. 2002/0087220 shows a system and method to provide maintenance for an electrical power generation, transmission and distribution system with maintenance personnel visiting a site to inspect a condition of said apparatus, and examine information from an Information System operated in co-ordination with a Help Desk. The system does not incorporate GIS date and does not concern crew workflow and dispatching to different locations.

U.S. patent application Ser. No. 2002/0198627 shows a predictive failure for semiconductor processing applications by presently monitoring operating parameters of the power delivery system in order to predict maintenance requirements and to avoid power delivery system failure. It involves a specifically-located semiconductor processing facility/equipment, rather than a group of geographically-spread facilities/equipment which may be associated with GIS date. It neither concerns any crew workflow and dispatching to different geographic locations of the facilities/equipment.

U.S. patent application Ser. No. 2003/0028351 applies empiric numeric modeling in science, medicine, meteorology, sociology, disease control, manufacturing and other areas, including utility service. In the aspect, the system predicts customer demand in order to optimize power grid operations, to predict equipment failures or power outage so that appropriate equipment maintenance and replacement can be undertaken timely. The application mentions that data can be collected and input with the aid of geographical positioning systems ("GPS") or global information systems ("GIS"). However, the disclosure does not specifically apply GIS to utility outage, neither does it discuss any concern regarding crew workflow and dispatching to different locations.

AVL (Automated Vehicle Location) technologies were designed to locate vehicles for fleet management purposes and for stolen vehicle recovery, which infrastructure can be land-based radio towers or satellites. However, AVL has not yet been applied in utility management.

There are many other patents and articles are oriented toward the OMS/Dispatch or other aspects of utility's operation management.

Currently, there is a demand for a fully integrate utility management system to realize the benefits of GIS technology and existing software systems including CIS (Customer Information System) and Billing data, WMS (Work Management System), IVR (Interactive Voice Recognition) call management, SCADA (Supervisory Control and Data Acquisition), MCM (Mobile Crew Management), AVL (Automated Vehicle Location), AMR (Automatic Meter Reading), Engineering planning packages, etc, i.e., all aspects of a utility's operation management in a seamless application set.

SUMMARY OF THE INVENTION

It is a purpose of this invention to provide a system with new accesses to a wealth of information not previously available to the utility company with a smooth transition and without interruption of service or loss of data integrity during the changeover.

It is another purpose of this invention to provide utility companies a turnkey solution of data conversion and/or field GPS data collection for establishment of an accurate electronic model of the utility's service area.

It is another purpose of this invention to provide an user interface to display utility and landbase GIS data which allows the user to edit GIS data, to define custom data entry grids for editing attribute data for GIS features, to create non-GIS, but spatially located, sketches on top of the GIS data and to enable and/or filter their display, to create any number of edit session/work order control templates, to manage work flow for these edit sessions through three defined states: working (being planned and drawn), proposed (approved, but not built), and existing (matches real world features—"as built").

It is another purpose of this invention to provide a system which replicates the entire dataset to each client machine instead of serving data over the network, allows for complete disconnected editing that is automatically reconciled when the client machine is reconnected to the network, supports several different types of utility networks, traces networked features that are targeted directly to utility customer's task, creates custom trace reports, provides a complete outage management sub-system, provides a complete set of web tools for managing crews, creates work orders, for managing outages and outage callbacks, for viewing, for searching the GIS, for controlling security, and for displaying custom reports.

It is another purpose of this invention to analysts take existing electronic mapping data and convert it to a comprehensive ESRI-based GIS that is fully compatible with third-party systems.

It is another purpose of this invention to grow, split, combine, and shrink outages and maintain correct historical information for the generation of reliability indices which are required by law (how many customers were out of power for how long, etc.).

It is another purpose of this invention to automatically integrate AVL data with all the components, such as OMS/Dispatch, Work Management, Web Interfaces, etc. comprehensively.

It is another purpose of this invention to perform any type of system operation while being disconnected from the central network in the field and to have these operations transparently synchronized with the rest of the system once reconnected.

It is another purpose of this invention to customize a work management system based upon a utility company's needs by allowing the user to configure any type of work unit that needs to be tracked.

It is still another purpose of this invention to allow field GPS professionals utilize the latest in GPS technology to provide extremely accurate field collection and/or verification of mapping points and listing of facility attributes.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein:

FIGS. 4-46 illustrate graphic displays for presenting power outage management to users of the UtilityCenter™ shown in FIG. 1.

FIGS. 47-49 illustrate sample data tables comprising UAI required system fields according to the invention.

FIGS. 50-52 illustrate sample customized database tables and a work order table according to the invention.

FIG. 53 shows reliability indices obtained according to the invention.

FIG. 55 is a representation of the type of information stored in the protective devices table according to the invention.

FIG. 56 is a simplified representation of a customer table according to the invention.

FIG. 59 is a logical representation of the trace cache according to the invention.

DESCRIPTION OF THE PREFERRED EMBODIMENTS

UtilityCenter™ 10 is an integrated GIS suite of applications that manages information across the entire utility. The integrated suite includes deferent applications, such as uaView™, uaFM™, uaField™, uaDispatch™, etc., along with a series of plug-in modules and interface portals that add accessibility and functionality. The primary data for the UtilityCenter™ 10 is stored in a Microsoft SQL Server® database 800. The Structured Query Language (SQL) is a standardized query language for requesting information from a database, it has been the favorite query language for database management systems running on minicomputers and mainframes because it supports distributed databases (databases that are spread out over several computer systems). GIS data is stored in SQL tables. This enables several users on a local-area network to access the same database simultaneously. The UtilityCenter™ 10 includes subsystems: a uaFM system 100, a Work Management system 200, an Outage Management system (OMS) 300, a Field Management system 400, set on top of ArcMap/ArcObjects 500 and ESRI MapObjects 600 which are associated with ESRI SDE Geo Database 700. The Environmental Systems Research Inst., Inc. (ESRI) Spatial Database Engine (SDE) data can be stored in any relational database management systems (RDBMS) that is supported by SDE, including, but not limited to, Microsoft SQL Server®, Oracle®, Access®, or in mixed implementations.

Figure 1:
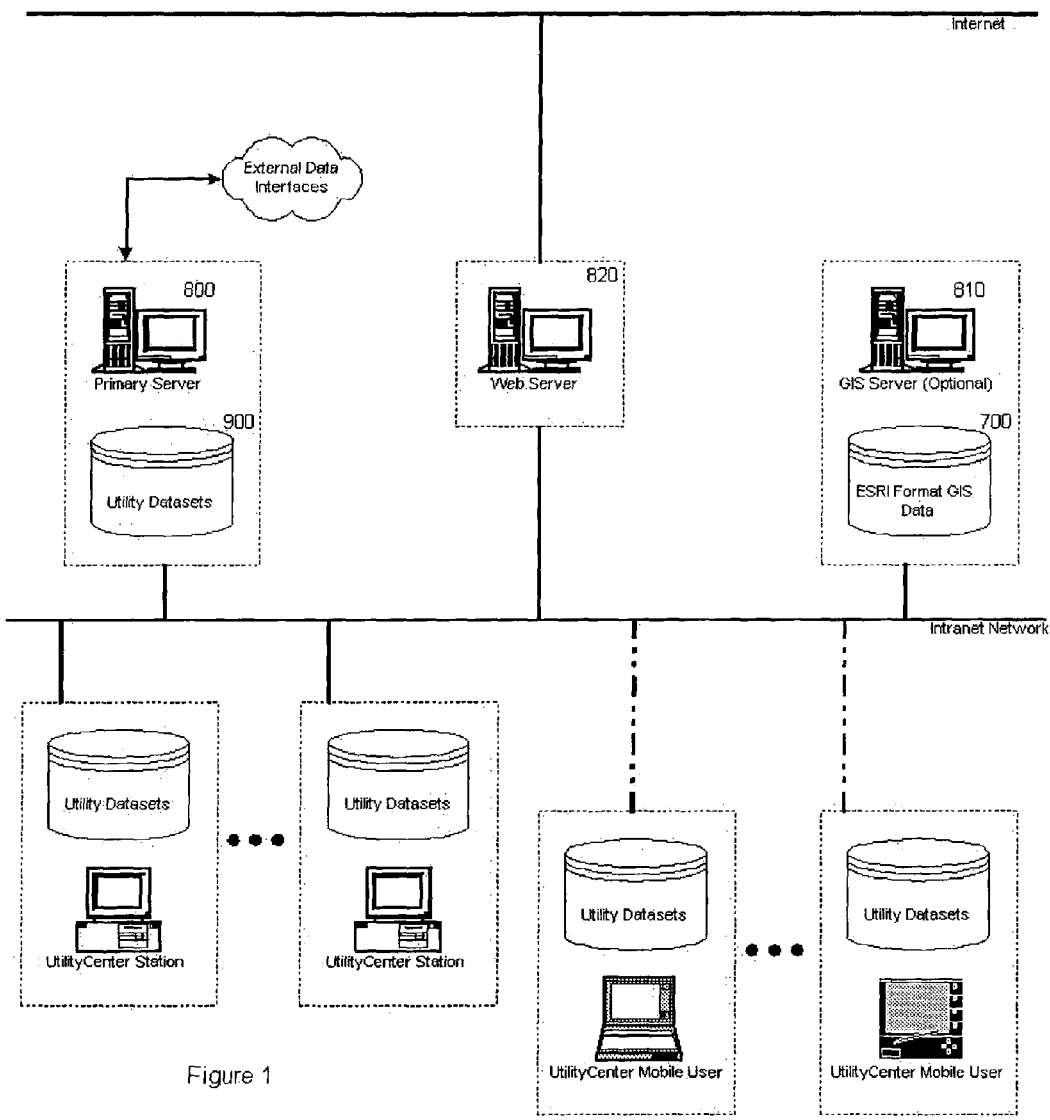
FIG. 1 shows a deployment diagram of the UtilityCenter™ according to the invention.

FIG. 1 shows a simplified and typical deployment of the UtilityCenter 10. All the utility data and external data interface products is initially loaded in a primary server. Next, the GIS server 810 is set up. For a smaller utility company, the uaFM GIS data may reside on the primary server, but it is typically set up on a separate computer or storage medium for a big utility company. The ESRI SDE GeoDatabases are extracted from the utility datasets on the primary server and loaded into a SDE. Thereafter, The webproducts 1500 are installed on a Web Server 820, and the necessary database connections are established. An interface uaARCi 710 is provided between the ESRI SDE Geo Database 700 and the UAI database 900.

Once the servers are setup, all of the computers, desktops and laptops installed with the UtilityCenter™ 10 software are connected to the servers. Part of the software installation sets up the necessary database subscriptions.

Figure 2:
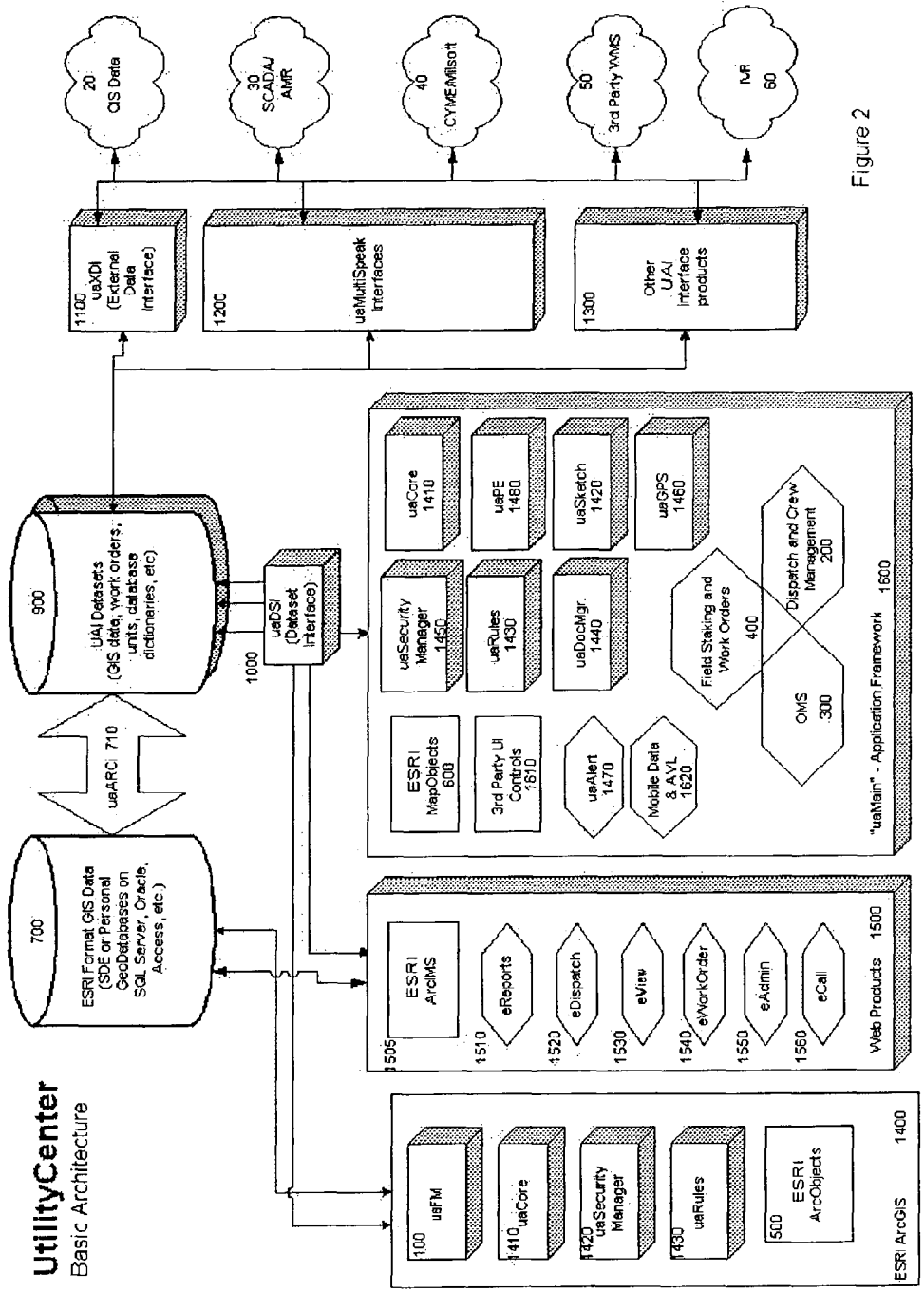
FIG. 2 is a detailed architecture of the UtilityCenter™ shown in FIG. 1.

The data schemas in the UtilityCenter™ 10 are very flexible and are controlled and described by an extensive set of metadata. In particular, a complex, customized user interface is provided to report or for reviewing the data by manipulating metadata. FIG. 47 shows the Database Dictionary, or DBD, table. In this table, every field in every utility theme (e.g., CONDUCT, WATERPIPE, GASVALVE, etc.) is described. The metadata in the DBD table is used to format all data entry and reporting grids in the UtilityCenter application. In FIG. 2, each 3D Rectangle box contains a component or standalone program produced according to the invention, each 2D Rectangle box contains a 3rd party component, and each hexagon contains a function within a program of the invention that do not have a 1-1 correspondence with a particular component or executable.

The UtilityCenter™ 10 imports data from Customer Information Systems (CIS) 20, data from SCADA devices 30, data from CYME®/Milsoft® 40, data from third part Work Management systems (WMS) 50, data from IVR (Interactive Voice Recognition) call management and/or automatic meter reading systems (AMR) 60 into a UAI database 900 via three broad categories of interfaces: database-to-database interfaces 1100, and MultiSpeak interfaces 1200, and custom interfaces 1300.

The UAI database 900 is stored with UAI datasets comprising the following sub-databases:

DBD A database dictionary contains metadata, user logins, lookup tables, settings, work order types, table descriptions, etc.

EXISTING A database contains all "as built" data, consisting of tables each corresponding to one type of GIS feature, e.g., Poles, Water Pipes, Substations, Gas Regulators, etc. The schemas for each of these tables consist of UAI required system fields, shown in FIG. 48, plus any custom-designed fields, shown in FIG. 49, as described in the DBD (FIG. 47).

PROPOSED A database contains the same GIS feature tables as EXISTING, with matching schemas. However, these tables contain features that are part of approved work orders that have not been completed.

WORKING A database contains the same GIS feature tables as EXISTING, with matching schemas. However, these tables contain features that are part of work orders that are still in the creation stage and have not been approved.

HISTORICAL A database contains the same GIS feature tables as EXISTING, with matching schemas. These tables contain a historical record of all changes made to features (adds, deletes, and updates). This database is only present on the server.

OFFLINE A database similar to Historical but is a long-term historical record. A utility company can decide on how long changes reside in Historical before being moved to Offline. This database is also only present on the server.

READONLY A database contains data imported from external data sources, such as Billing and CIS information, that are not editable by the UtilityCenter™ users.

OMS A database contains data related to the Outage Management System 300.

CREWMGMT A database contains data related to the work crew management 200.

SKETCH A database contains sketches—graphical objects that do not correspond to GIS features, such as notes, redlines, and ad hoc terrain details.

ESTIMATION A database contains equipment lists, labor costs and codes, and prices for doing job cost estimation.

TRANSFER A standard superset schema that provides a buffer layer for transferring data to and from interfaces. The database is used extensively by the MultiSpeak interfaces, but also used by other types of interfaces.

WOI A database contains information related to $3^{rd}$ party work management interfaces.

The UAI database 900 interacts with the ESRI SDE Geo Databases 700 to integrate ArcMap/ArcObjects 500 and ESRI MapObjects 600 into different function units categories in three groups: ESRI/arcGIS 1400, Web Products 1500, and "uaMain"—Application Framework 1600. The group of the ESRI/arcGIS 1400 includes uaFM 100, uaCore 1410, uaSecurity Manager 1420, and uarules 1430. The group of the Web Products 1500 includes eRoperts 1510, eDispatch 1520, eView 1530, eWorkOrder 1540, and eAdmin 1550. The group of "uaMain"—Application Framework 1600 includes uaCore 1410, uaSecurity Manager 1420, uarules 1430.

A majority of the database-to-database interfaces 1100 just involve importing and exporting of table data with minimal transformation. An application called uaXDI (eXternal Data Interface) is developed to manage these jobs and maintain metadata about the jobs. The functions of the uaXDi includes: transferring data from one data source to another, synchronizing data between two identical tables, and showing the record differences between two identical tables in the form of Inserts, Deletes and Updates. As a general rule, if the data to be interfaced with resides in a relational database management system (RDBMS) with a known schema, or the data is the result of reports or data dumps to a comma-separated value (CSV, another name for the comma-delimited format of data representation) or fixed length format file, the uaXDi can transfer to or synchronize with the data in the UAI databases 900. In particular, the uaXDi has the following features:

UAXDI CAN BE RUN AS A WINDOWS SERVICE TO SCHEDULE TABLE SYNCHRONIZATION.

AD HOC QUERIES CAN BE RUN WITHIN UAXDI TO VIEW, INSERT, UPDATE OR DELETE DATA.

DATA CAN BE TRANSFERRED FROM LOCAL SQL SERVER TO LOCAL SQL SERVER.

DATA CAN BE TRANSFERRED FROM REMOTE SQL SERVER TO LOCAL SQL SERVER.

DATA CAN BE TRANSFERRED FROM LOCAL SQL SERVER TO REMOTE SQL SERVER.

DATA CAN BE TRANSFERRED FROM MICROSOFT ACCESS DATABASE TO LOCAL SQL SERVER.

DATA CAN BE TRANSFERRED FROM LOCAL SQL SERVER TO MICROSOFT ACCESS DATABASE.

DATA CAN BE TRANSFERRED FROM LOCAL SQL SERVER TO AN ORACLE DATABASE.

DATA CAN BE TRANSFERRED FROM AN ORACLE DATABASE TO A LOCAL SQL SERVER.

DATA CAN BE TRANSFERRED FROM A CSV FILE TO A LOCAL SQL SERVER.

DATA CAN BE TRANSFERRED FROM A LOCAL SQL SERVER TO A CSV FILE.

DATA CAN BE TRANSFERRED FROM A FIXED LENGTH FILE TO A LOCAL SQL SERVER.

Data can be transferred from a view in SQL Server to a Local SQL Server.

MultiSpeak is a standard defined by the Cooperative Research Network (CRN) that is run by the National Rural Electric Cooperative Association (NRECA). It uses Extensible Markup Language (XML) to define the data and the transport mechanism for a standard method of creating interfaces. MultiSpeak 10, the current version of the standard, defines a near real-time interface for hi-directional data transfer. The UtilityCenter™ 10 achieves MultiSpeak compliance for its applications. MultiSpeak is designed for companies that provide software for electrical utilities and, specifically, for electrical cooperatives.

The MultiSpeak interfaces 1200 currently define transfers to and from systems including: GIS 900, CIS 20, SCADA 30, Engineering Analysis (not shown), IVR 60, Load Management (not shown), Staking (not shown), and third party Work Management 50, etc.

Each type of transaction has a standard XML schema that attempts to address a superset of application needs, so the development of the interfaces involves a transformation of the data to and from the MultiSpeak schemas. A Transfer database that matches the MultiSpeak schemas is provided to each MultiSpeak scheme, then the MultiSpeak interfaces 1200 are provided to transfer data to and from the customer specific UAI databases 900 to the Transfer tables. In other words, each MultiSpeak interface running as a service handles the traffic between the UtilityCenter™ 10 and a MultiSpeak compliant application. The UtilityCenter™ 10 uses the Transfer database as a part of a middle-tier layer that makes it easy for $3^{rd}$ party clients to interface to the known and published schemas according to the Transfer database tables. Although each utility company may require a set of interfaces between its custom-configured tables and the Transfer databases. The interface components can be modified and reused.

The custom interfaces 1300 are designed to provide bi-directional data flows between the UAI databases and any types of $3^{rd}$ party systems that were present at a utility company's site and are implemented in several different ways. The simplest type of custom interface is a Microsoft SQL Server job. Combined with triggers and various scheduling techniques, the interface copies and/or updates data through any standard database protocols (ODBS, linked servers, etc.). These job level interfaces are powerful, but hardest to document and maintain as schemas and protocols change on either side of the interfaces.

Alternatively, the custom interfaces 1300 are created as standalone programs or integrated modules, which are useful for performing complex transformation and reformatting of data. For example, in a pre-MultiSpeak engineering analysis interface (not shown), where, on demand, a "snapshot" of a utility network is created by the interface program and converted to a format to be loaded and worked upon by a standalone engineering analysis package, such as CYME or Milsoft. Results from this analysis can be loaded back into the UAI databases 900 by executing attribute updates. As another example, a "real time" interface (not shown) is available to third party work management systems, where UAI and the 3rd party vendor have established a socket protocol. Software interfaces can be integrated directly into the UtilityCenter™ 10 via a custom interface. For example, a data export can be initiated through the custom interface, where the data transfer is initiated by the application user, or may be set up as a NT service, where the data transfer happens automatically on the main server. Other examples of these types of interfaces are the interfaces to Centurion® IVR, Porche® IVR, and the SEDC® CIS system The operation and interaction among the above-described data components are described as follows to provide total system solutions for electric, water, wastewater and gas utilities through a wide spectrum of information technology via a seamless, intelligent electronic map of utility transmission and distribution systems. The UtiltyCenter™ 10 allows a utility company to automate daily operations including: automatic updating and maintenance of electronic maps, outage management, electronic field design and editing, engineering planning, customer service, marketing, Supervisory Control and Data Acquisition (SCADA), and billing.

Depending on the 3rd party software, the actual interfaces for Engineering Analysis, Load Management, Staking, or i-PLAN can be 1100, 1200, or 1300. For example, there is a custom interface to Milsoft (1300), but there is also a Multi-Speak interface to Milsoft (1200).

Figure 3A:
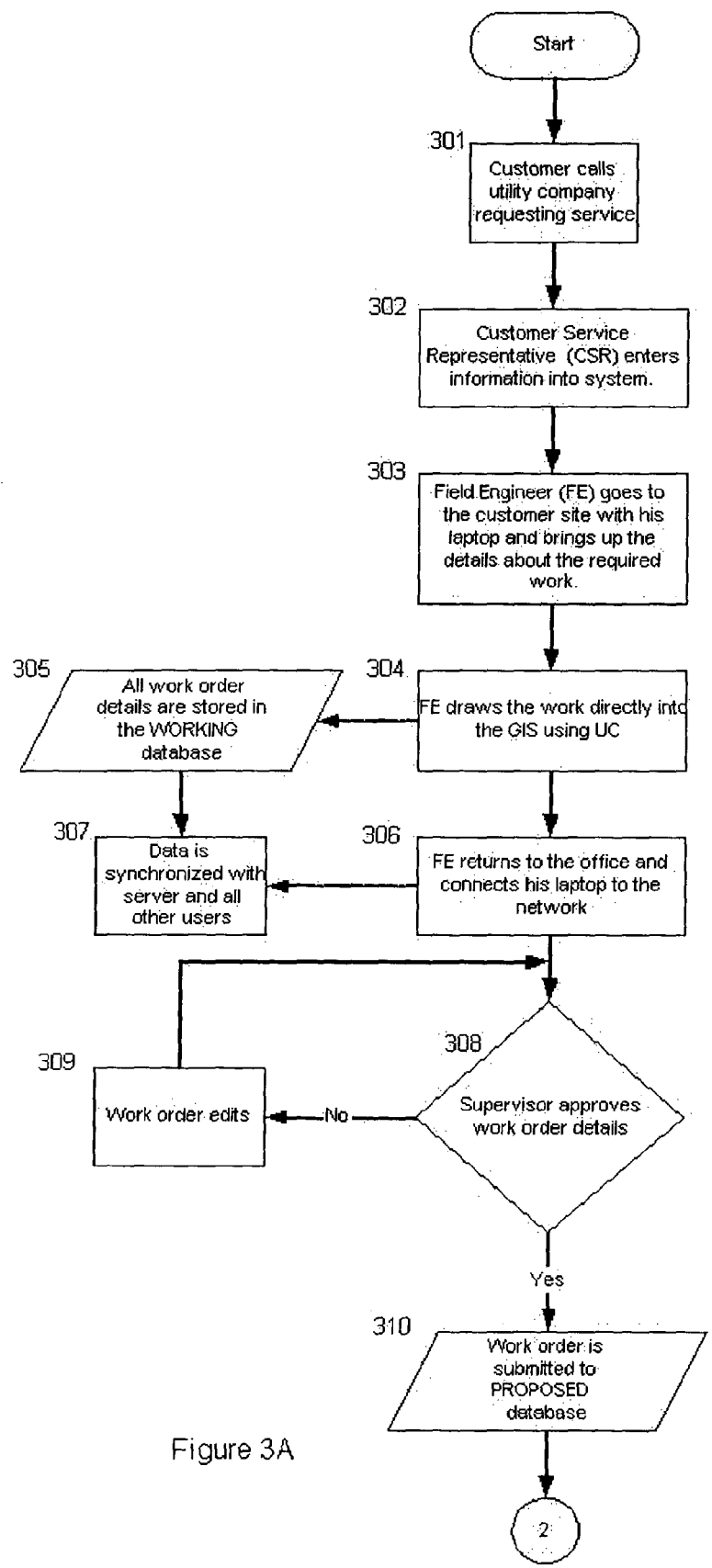
FIG. 3 is an example operation flow chart of the UtilityCenter™ shown in FIG. 1.
Figure 3B:
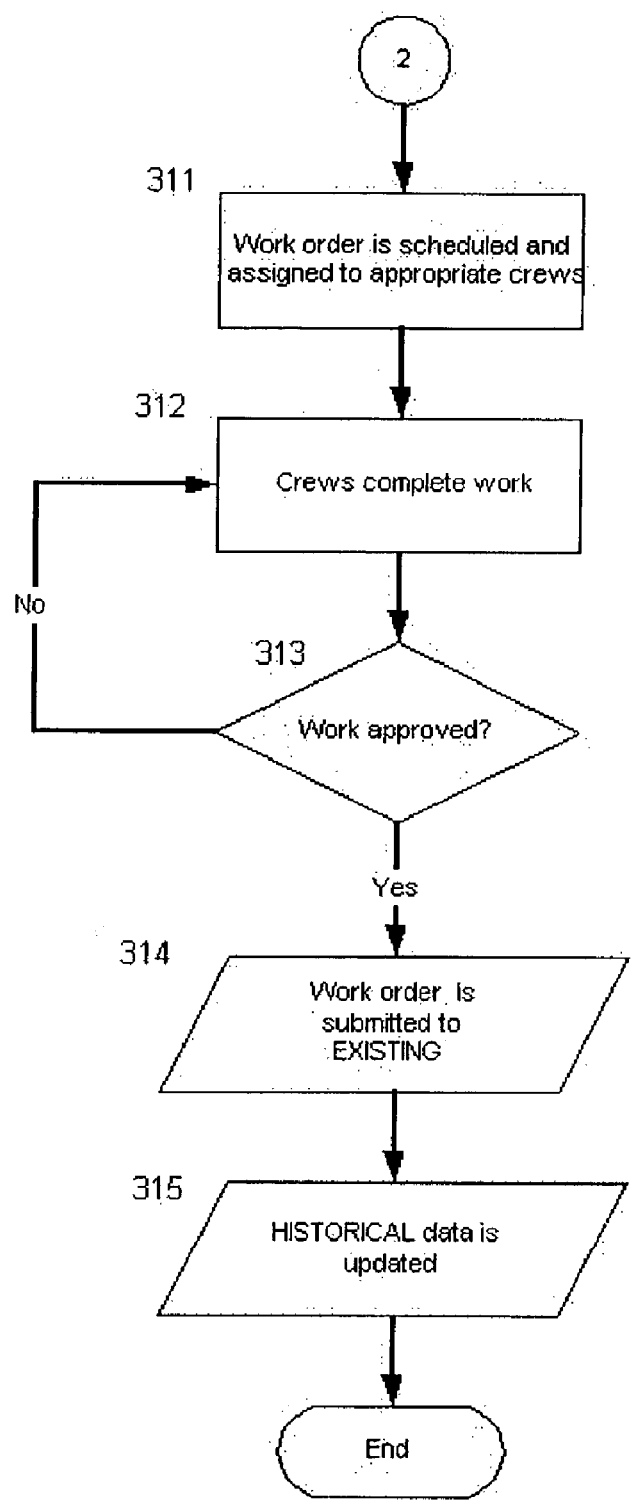

For example (FIG. 3), after customers call the utility company to request service in a step 301, a Customer Service Representative (CRS) enters the trouble call information into the system internally, via the web, or into a third party wok management system in a step 302. The UtilityCenter™ 10 then assigns a Field Engineer (FE) to the customer site with a laptop and brings up the required work in a step 303. The work information is stored under a Work Order Header. The FE directly interacts with the UtilityCenter™ 10 to draw work order based upon GIS features and sketches retrieved form the GIS 900. New features can be inserted by hand, by constructive geometry, or by GIS location in a step 304. Then the entered information is transmitted and stored in the Working database in a step 305 from the filed so as to be synchronized with the data in the server and shared among all user in a step 307. Alternatively, the entered information is carried in the laptop then imported into the UtilityCenter™ 10 after the FE gets back to the office in a step 306 so as to be synchronized therein in the step 307. A superior then reviews, changes (step 309) or approves the work order details, estimates the cost in a step 308. The review includes engineering analysis and checks for (i) rules for connectivity, (ii) required database fields, and (iii) other dependencies. Thereafter, the work order is submitted to the PROPOSED database in a step 310 to be scheduled and assigned to appropriate crews in a step 311. The assigned crews arrive the site to complete the work in a step 312 by referencing the work order electronically of through printed maps and reports. After the work is approved in a step 313, the work order is then submitted to the EXISTING database in a step 314 so to update the HISTORICAL database in a step 315.

Module G-1 Basic AM/FM/GIS Solution

Figure 14:
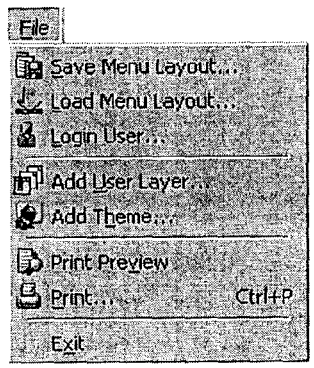

As shown in FIG. 14, the Utility Center Core menu is located at the top of the application. The available options can be accessed by clicking on the desired menu heading. A drop down list will appear. If the user does not have sufficient permission, the options will be grayed out.

The UtilityCenter™ 10's core AM/FM/GIS system provides the ability to view and manage customer and facility data on a seamless, electronic map of the utility's service area. Building on the foundation of ESRI's ArcGIS 8.x technology, the uaFM™ 100 module enhances facilities management capabilities. In terms of facility/asset management, the uaFM™ 100 provides comprehensive AM/FM/GIS functionality through enhancement of ESRI's ArcInfo 8 technology. The uaFM™ 100 module provides users with the ability to make global system edits to a seamless, intelligent electronic map of the service area. The uaFM™ 100 also provides the ability to easily plot and print professional hard-copy maps along with customized keys. Basic updating of the system electronic map is accomplished through the uaFM's 100 editing capabilities. The editing functionality includes easy input of survey data. Its standard templates for utilities include a data model and rule base architecture for rapid data entry. Individual and global edits can be entered quickly into the GIS, eliminating duplicate data entry and flowing changes to other users automatically. The uaFM™ 100 provides the ability to quickly query the electronic map to find desired customer or facility locations and associated information. Detailed maps can be easily generated using the uaFM's 100 print and plot capability. The uaFM™ 100 also provides database creation, maintenance, and error checking to facilitate a functional solution. In this regard, the uaFM™ 100 includes the following capabilities:

Editing of facilities database
User definable GUI interface of database
Security for database access and editing
Automatic synchronization of edits to server and other users
Rule based data integrity checking and reporting to user The integration of Customer Information Systems with the uaFM™ 100 provides seamless exchange of customer and facility data. This integration results in the ability to view customer and facility information graphically within the GIS 900 and eliminates duplicate data entry by flowing information between the systems.

Figure 15:
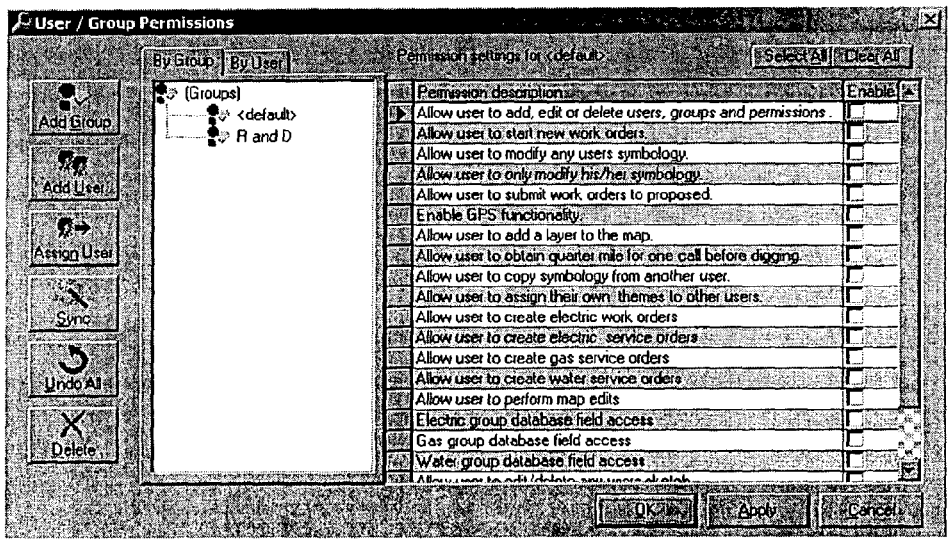

The uaSecurity Manager 1420 provides administrators the tools they need to fully control access to functionality throughout the enterprise. FIG. 15 shows a User/Group Permissions dialogue box. Through a simple point-and-click interface, functionality is assigned by individual and workgroup settings. This ability to specifically assign and control functionality allows end-users to access the tools needed to perform daily work.

To provide Web-enabled Security, the e-Admin™ 1550 allows administrators also access and change security settings from remote workstations or PCs through secure network connection.

A uaTraceEngine enable the uaFM™ 100 to support network tracing up and downstream from selected facilities to nearest protective device, switch or substation feeder. The uaFM 100 also displays customers located along the trace along with usage totals, facilities information and other data. The tracing can be conducted by Phase, Upstream, Downstream, to First Upline Device, to Direct Downline Devices, and generates Reports. The Trace tab is set under the Tool Menu to show Open Arcs Disconnected (from the data model), Phase Differences (Displays arcs where phasing has changed incorrectly), or Open Arcs. Arcs may be disconnected due to snapping issues or due to the status of a barrier feature.

Connectivity is the key to successful utilization of an intelligent, electronic map. The uaRulebase™ 1430 supports true virtual connectivity of system components so users are working with an accurate system model when responding to outages, conducting system studies or developing budgets.

A Data Integrity Checker is provided for references user defined settings that prohibit incomplete data and/or data not meeting certain requirements from being entered into the master dataset. Data not meeting the specified requirements is identified and listed for corrections.

Module G-2 Map Viewing Solution

The e-View™ 1530 allows the users to view seamless maps through the use of geographic information system (GIS) technology. It can measure distance on the map from any point to any other point and has continuous zoom and pan capabilities. The e-View™ 1530 also provides network tracing, and point and click printing and plotting using quick button functions. It allows the user to perform searches using partial words, drop down lists and also allows user defined searches.

The e-View™ 1530 pushes mapping information across departmental lines to virtually any employee in the organization to supports Web-enabled Map Viewing. Integrated customer and facility information is available via secure network connection from internal workstations or remotely located mobile computers. The e-View™ 1530 assists line crews in finding the location of customers and other utility features. The application also helps the line crews to see database information about features on the map. A user can order Electronic Truck Maps.

Figure 16:

Users accessing the seamless electronic map via the web will have ability to view the entire system or zoom to selected areas under the View Menu (FIG. 16), query for customer or facility information and pan easily throughout the system to find the desired area. In FIG. 16, the Pan tool allows the user to shift the map (at the same scale). Click anywhere in the map area and drag the hand across the map. Finally, release the mouse button. The map will automatically redraw, showing the new area. Snapping is useful when making graphic changes to the map. The number displayed tells the user the current snap distance setting.

Figure 18:
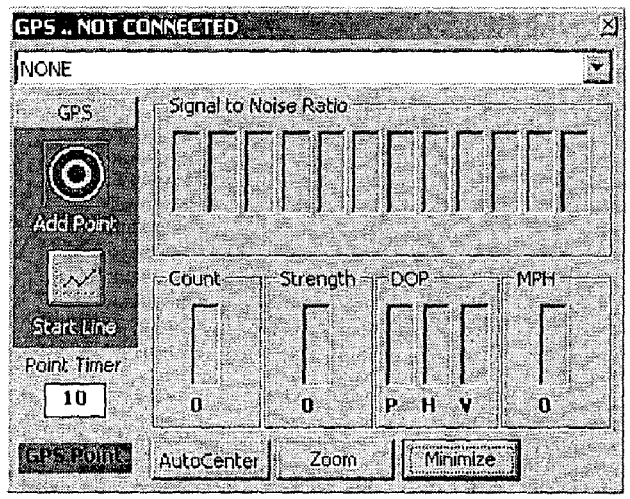
Figure 19:
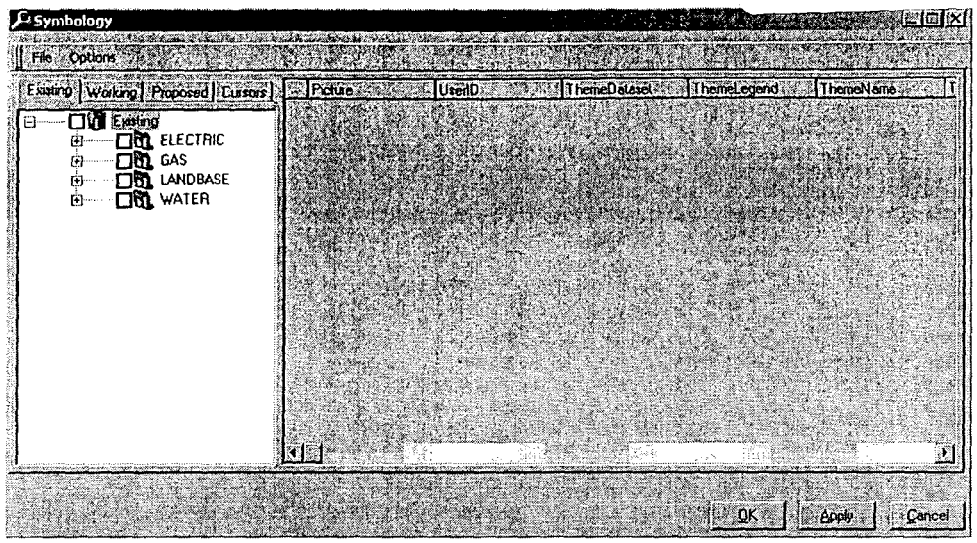
Figure 20:
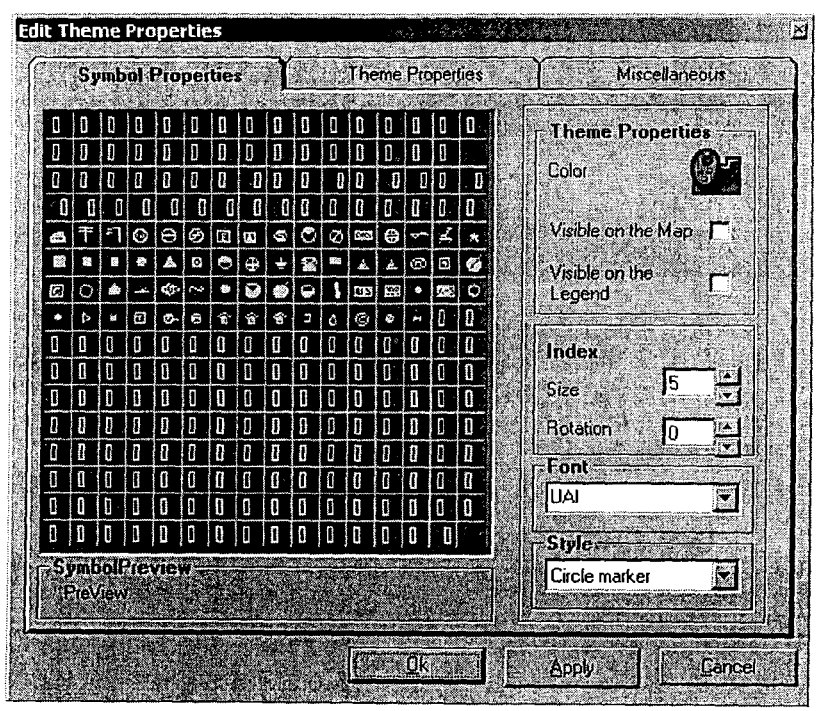
Figure 21:
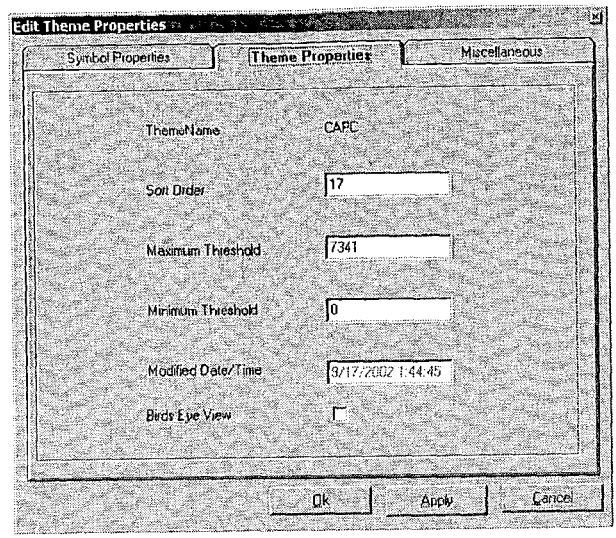
Figure 22:
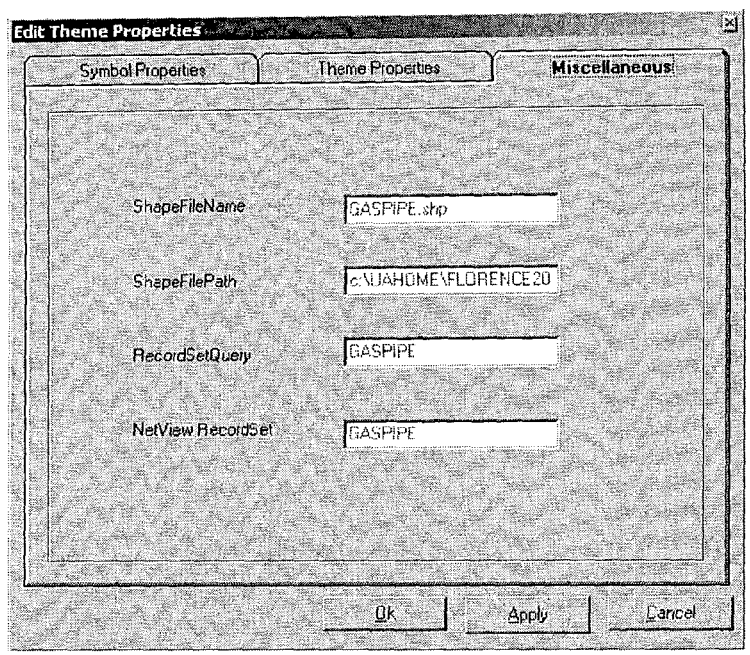

Under the Tools Menu (FIG. 17), the user can measure map distance by single clicking to begin the measuring and double clicking to end. A box will appear telling the user the distance between the specified points. The use can also activate an uaGPS 1440 interface as shown in FIG. 18. The user can further set all symbology for all themes including Existing, Working, and Proposed databases via the Symbology dialogue box (FIG. 19). Different symbology shown in the symbol Properties box in FIG. 20 can be assigned for different users, and the theme properties, such as the theme name, sort order, the maximum and the minimum scales at which the theme will be visible (feet), time stamp, Birds Eye View, can be edited via the Theme Properties box in FIG. 21. The Font area is used to access symbol palettes provided internally and other companies like ESRI. If ESRI software is installed on the local machine, then all symbology available through those packages can be used with the Utility Center 10. Once the user has selected palette from the list, all symbols contained in that palette will appear on the left hand side. Symbology is stored in the uaTheme table and is accessed based on UserID. The Miscellaneous box in FIG. 22 shows the Name of and the local path to the shapefile for the selected theme, and the relevant recordset.

Figure 17:
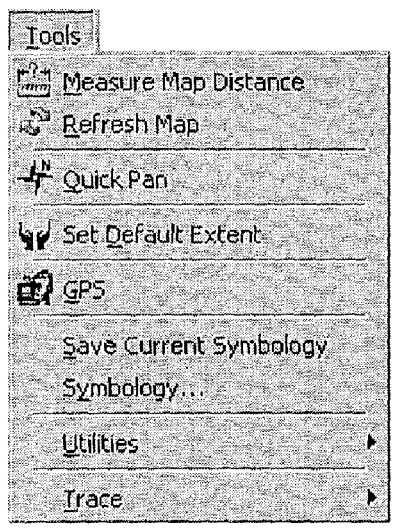
Figure 23:
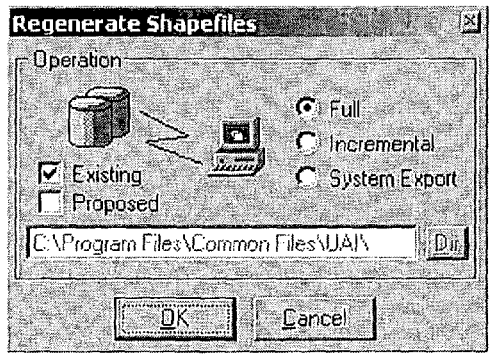

Also under the Tool Menu in FIG. 17, the Utility tab is linked with the functions of: Regenerate Shapefiles, Sync with Publisher, Download Read Only Data, Download Misc Directory (to the local machine), and Download/views (to the local machine). The Regenerate Shapefiles dialogue box in FIG. 23 allows the user to specify a Full or Incremental update of the shapefiles for Existing and Proposed databases. This form also allows the user to do an export of the entire dataset to shapefiles. The Sync with Publisher is trigger to upload and download changes between the local machine and the server, which is the process for syncing databases between the local machine and the server. This process will also run automatically once every hour by default.

A Theme Pop Up Menu (FIG. 24) is accessed by right clicking on a layer in the legend. This menu contains a list of options unique to the specified layer. For example, FIG. 25 shows Conducts in bird's view. As another example, FIG. 26 shows element source information.

In short, the e-View™ 1530 includes the following functionality:

Seamless maps
Map and database query
Fast zooms using partial word searches
Continuous zoom and pan
Bird's eye view
Set minimum and maximum thresholds
Point and click printing and plotting
Right mouse button quick functions
Auto hide legend
Floating mouse tips
Color by feeder, phase, size, etc.
Measure distance
Displays facility information
Map plotting Module G-3 Field Viewing Solution The UtilityCenter™ 10's Field Viewing Solution takes the power of GIS 900 and makes it field portable for those requiring only basic viewing functionality. The uaView™ 1530 provides in-field crews with instant access to updated GIS 900 information and the ability to graphically view customer and facility locations as well as detailed information. Utilizing ESRI's innovative ArcReader™ technology, the uaView™ 1530 enhances the daily workflow of service and line crews by providing fingertip access to the information they need to complete daily assignments. Users accessing the seamless electronic map will have ability to view the entire system or zoom to selected areas, query for customer or facility information and pan easily throughout the system to find the desired area.

Module G-4 Field/Office Design and Staking Solution

The UtilityCenter™ 10's Field Design and Staking Solution (within the Filed Staking and Work Orders sub-system 400) builds on the Basic AM/FM/GIS solution module to provide the tools necessary to update and maintain the intelligent, electronic map. It allows utility staking engineers to draw work orders in the field and perform job estimation. These work orders are transferred automatically into a proposed system on the network. After construction is complete the proposed work orders are electronically transferred to the existing plant. All utility personnel have the ability to draw their proposed work such as system improvement, right of way jobs, or other suggested changes into the system. All proposed jobs can be queried or viewed enterprise wide. The uaField™ 100 prints staking sheets and generates a material order list showing the assembly unit with additions and removals. It also transfers the assembly units' list to the client's inventory system to provide a pick list for a work order. The functionality outlined below provide full automation to the daily work order process, improving the efficiency of staking engineers, GIS design technicians, line crews, warehouse personnel and others involved in the engineering design and construction process.

The uaField™ 100 easily stakes new construction work orders in the field or office and update that information directly into the GIS 900 to avoid duplicate data entry. Because the GIS 900 is seamless and completely field portable, staking engineers, line crews and others can have access to updated data daily. Engineers have the option of staking jobs on laptops in the field or on desktop PCs in the office. Either way, data is incorporated into the GIS 900 in a proposed layer, then flowed to the different departments involved in fulfilling the order: warehousing, construction crews, managers, etc. As the job is completed, as-built changes are entered into the system and the final job posted into the existing GIS. Staking sheets can be designed and customized based on the specific needs of individual utilities. Work order information is flowed automatically from the initial entry by CSRs into the Customer Information System (CIS) giving crews all the vital information they need to complete the job. Once the proposed work order is entered into the GIS, the uaField™ 100 automatically generates a construction assembly report detailing the components necessary to complete the job as designed. This information is flowed to the warehouse as a picking sheet so materials are ready for crews to load before heading out to build the job.

Because the UtilityCenter™ is fully integrated with the utility's Customer Information and Accounting software, cost estimates can be generated quickly. The uaField™ 100 handles multiple job scenarios and provide estimates of their job costs. The user has the option to use either unit costs or hourly costs. Updated material cost and labor rates are utilized to formulate an accurate estimate of the cost of building the job as designed. This information is invaluable when analyzing the efficiency of work processes, budgeting for future growth and preparing managerial cost reports. The UtilityCenter™ 10 makes managing work easier than ever before by giving managers fingertip access to information concerning job status. With the click of a mouse, managers can view what jobs are pending, assigned and in progress. Truck location can be displayed onscreen as crews move throughout the system completing assigned jobs.

For the engineer or lineman needing to make quick notes out in the field, a uaSketch™ 1420 offers red line and sketch capabilities. Notes, job sketches, maintenance or repair concerns or other information can be entered in the field and attached to the pending work order. Back in the office, this information is accessible and utilized in preparing final work orders, maintenance tickets or repair requests. Red lined notes are archived and attached to the original work order for future reference. The uaSketch™ 1420 is present as a Sketch Manager dialogue box in FIG. 27

When a work order is finished, it is posted as "pending" in the GIS. This proposed job is viewable by all users throughout the system so every employee is aware of the job and the pending change in the GIS. Proposed jobs are color coded so users can easily identify which facilities are in the current GIS 900 and which are in process of construction.

Because the entire GIS field is portable, it is possible for multiple users to make edits to the same facilities—one on the field portable computer and one on the main server. The UtilityCenter™ 10 resolves conflicts based on administrative settings that determine which computer edits take priority. However, all conflicting edits are saved, allowing users to review changes and make a final determination which edits should be posted and which should be discarded.

Any changes made in the field are automatically updated through two-synchronization of field computers and the GIS server. As computers are docked and connected to the LAN, all updates are synchronized ensuring that crews have the latest GIS information on their computer when heading out for the next day's assignments. The GIS server is also updated with all in-field changes.

Figures 28, 29:
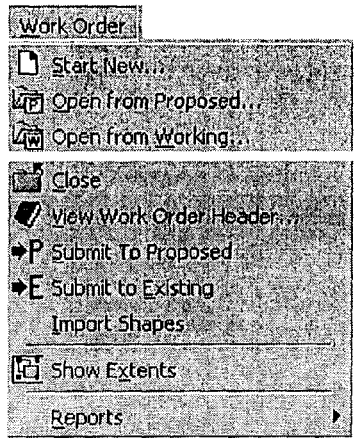

The e-WorkOrder™ 1540 is a powerful tool allowing managers to view the status of work orders in the system at anytime and from virtually any location via the Web. By logging into the system via secure internet or intranet connection, managers at remote locations can view the details and status of all work orders entered into the system. This information can also be accessed by Customer Service Representatives to answer customer inquiries concerning the status of new services or other requests. The e-WorkOrder™ 1540 is present via the Work Order Menu in FIG. 28. By clicking the Open from Proposed tab, a list of available Proposed Edit Sessions appears in FIG. 29.

The e-WorkOrder™ 1540 is customized based upon a utility company's needs by allowing the managers to configure any type of work unit that needs to be tracked. This customization is done by creating new tables in the database and new entries in the WOH_List (FIG. 50) and WOH_Control (FIG. 51) tables. An example schema of a work order table is shown in FIG. 52 for a simple gas utility service order.

All tracing functionality described in Module GI can be performed in the field on mobile computers. The uaField™ 100 allow user to do switching scenarios in the field ("What If" Switching Scenarios), where it's needed the most. Crews have the entire, seamless system model at their fingertips. The power of having this functionality in the field allows supervisors to make better decisions faster.

This module provides the following optional features: Auto wireless Updates from Field Crews, and Interfaces to Third-Party Material/Work Management System. With optional equipment, such as Cisco® Aironet 340 series 11 mbs Wireless Card, any changes made in the field are automatically updated through two-synchronization of field computers and the GIS server via wireless connection to the LAN. Field computers can stay in line trucks and other vehicles overnight while updating, and be ready for assignments the following morning with the updated GIS 900 in place.

The goal of seamless system integration is the ability retain existing third-party systems while empowering them with the information available from other systems via GIS. Integration to a variety of third-party Work Management Systems is accomplished through fully interfacing with other vendors via Interfaces to Third-Party Work Management System (i-WMS™). This allows managers to take advantage of the features and functionality of their favorite systems while also accessing customer and facility information.

Integration to existing Material Management Systems provides the ability to accurately manage inventory of materials used in daily operations. Construction assembly reports generated in uaField™ are flowed to the MMS via Interfaces to Third-Party Material Management Systems (I-MMS). As items are pulled from inventory, levels are automatically maintained in your MMS. Changes in materials, assembly units, cost, etc. are flowed back into uaField™ to ensure accuracy in assembly reports and cost estimates.

In this regard, the uaField™ 100 includes the following functionality:
  Draw work orders in the field or office
  Downstream and upstream trace
  Dynamic feeder and phase switching
  Loading information on any node in the system
  ROW and pole inspection tracking
  Red lining and notes
  Maintenance changes without work orders
  Prints staking sheets for construction crews
  Prints material order list showing assembly units
  Automatic map update
  Incorporates standard and/or user-defined assembly units
  Generation of cost estimates for work orders
  Interfaces to clients' inventory system for picking list
  Automatic archiving of work orders
  Tracks work orders from start to finish Module G-5 Outage Management Solution The UtilityCenter™ 10's Outage Management Solution provides the tools and functionality necessary to put GIS to work managing trouble calls and restoring service. This system uses a sophisticated prediction algorithm to determine a possible failed device and its service area, which is similar to the one employed in the U.S. patent application Ser. No. 5,568,399 but without lengthy upstream network tracing or fuzzy logic.

The system can list all the possible outages in tabular form as well as display the location of outages in multiple colors. By providing visualization of outages and crew management, workers can respond more quickly to trouble locations and have customers back in service faster.

An e-Dispatch™ 1520 lists all the possible outages in tabular form as well as display the location of outages in multiple colors. The displayed outages include all calls, affected customers, and callback lists. Outages can also be sorted in multiple ways such as priority, substation, feeder, and by specifying a number of other items. The e-Dispatch™ 1520 pushes information regarding outages and the restoration process throughout the utility via the Web. Through secure network connection via intranet or internet, users throughout the utility can access and view graphical information concerning outages, current status, assigned crews and affected customers. Because it is Web-enabled, users can access information from their own workstation or from remote locations in the field where network access is available.

The uaDispatch™ (within the Dispatch and Crew Management sub-system 200) provides vital information concerning trouble calls, outage location, prediction of fault location and management of responding crews. It is integrated with Interactive Voice Response systems to automatically deploy crews based on location. Dispatchers view outages on-screen grouped based upon which device has likely failed and caused the outage. Managers effectively assign and manage crews by sending them to the correct location.

The uaDispatch™ has the capability to change outage colors on the map depending upon the predicted outage, crew assigned, crew in route, crew arrival at the scene, and other user definable categories.

As power is restored, the uaDispatch™ generates callback lists of customers affected by the outage. Customers are contacted by CSRs or through the IVR to confirm that power has been restored. This CSR Customer Call Back and Restoration Confirmation feature allows dispatchers to determine if isolated customers are still without power. If so, a new trouble call is created and allows dispatchers to notify crews of the remaining repairs.

The uaDispatch™ allows tracing by individual phases from any node on the circuit. This function provides the user with loading information on individual phases to assist in load balancing.

Figures 39, 40:
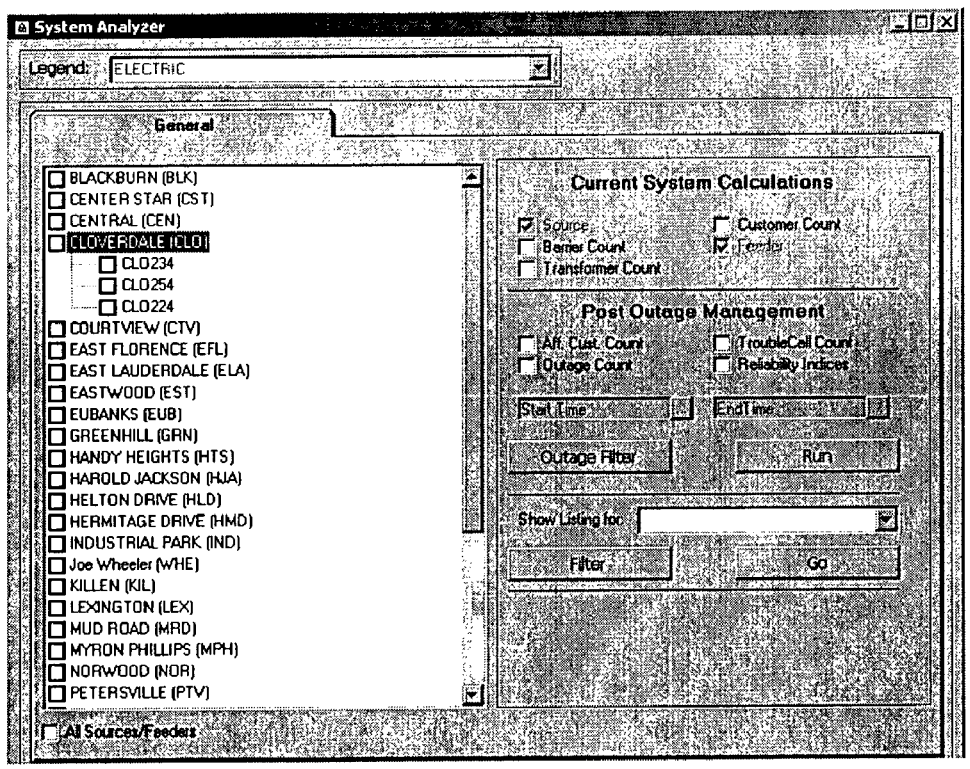

The uaDispatch™ archives all outage information, including switching orders, for generation of post-outage reports, reliability indices (e.g. FIG. 53), historic analysis and reports by circuit, or other user-defined region. All outage information is archived in Historical tables in the OMS database 300. A Historical Editor tab allows the user to edit the historical information. Outage and Trouble Call information are updated and changed, including dates and times, and saved again to the historical tables with the new information. Reliability Indices, such as System Average Interruption Frequency Index (SAIFI), System Average Interruption Duration Index (SAIDI), Customer Average Interruption Frequency Index (CAIFI), and Customer Average Interruption Duration Index (CAIDI), are calculated automatically from the historical outage and trouble call information that is stored in the historical tables. The user can view and print the reliability indices for individual feeders, individual substations, or the entire utility system. The System Analyzer (FIG. 40) allows the user to see these values.

Dispatchers can restore power to part of an outage area, leaving other parts in an outage. When the dispatcher performs a partial restoration, the list of all protective devices (switches, reclosers, valves, etc.) that were part of the original outage are displayed on a form. The dispatcher can then select one or more devices that are still out and the extent of the outage will be recalculated. Information about customers that were in the original outage, but who are not affected by the new outage is moved to the Historical tables. The newly created outage (or outages) is stamped as a partial restoration and has an ID link to the original outage. The start times and other tracking information from the original outage are maintained. This makes the reliability indices much more accurate, since customers are not erroneously reported as being in multiple outages.

The UtilityCenter's OMS 200 provides the user with two forms or grids to manage Outages, the Outage Management Grid and the Edit Outage form. From these forms, all necessary dispatcher functions can be performed to manage Outages. The Outage Management Grid displays all Outages in the monitored area of the user. From this grid, the user with the appropriate permissions can edit an Outage. The user can also select an Outage on the map by right clicking on it and selecting Edit Outage. The Edit Outage form allows a user to work a specific Outage in more detail.

Outages can be created in the system by a customer Service Representative, by a customer call, or a user. When a Customer Service Representative receiving Customer notification of a power disturbance, the CSR creates a Trouble Call using the uaDispatch™ or eNetCall (web-based, companion applications to UtilityCenter). This call will be picked up by the uaPE 1480 (Prediction Engine), which determines if the customer is in an existing or new outage and calculates the probable device that has caused the power disturbance. The Trouble Call and Outage are then drawn on the UtilityCenter Map. Users who may not be using the uaPE 1480 can Group the calls together in UtilityCenter. The uaPE 1480 will automatically group the calls.

Figure 30:
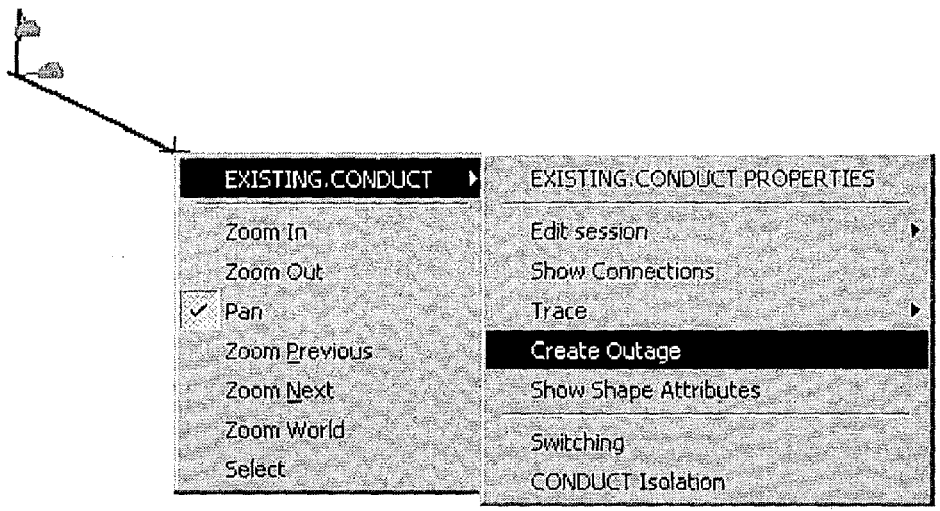

When a Customer calls to report a power disturbance, and an IVR (Interactive Voice Response System), logs the call. This call will be picked up by the uaPE 1480, which determines if the customer is in an existing or new outage and calculates the probable device that has caused the power disturbance. The Trouble Call and Outage are then drawn on the UtilityCenter Map. A user may create an Outage by 'Right Clicking' on a Conduct span or a Protective Device on the Map and selecting 'Create Outage' from the display menu (FIG. 30).

Figure 31:
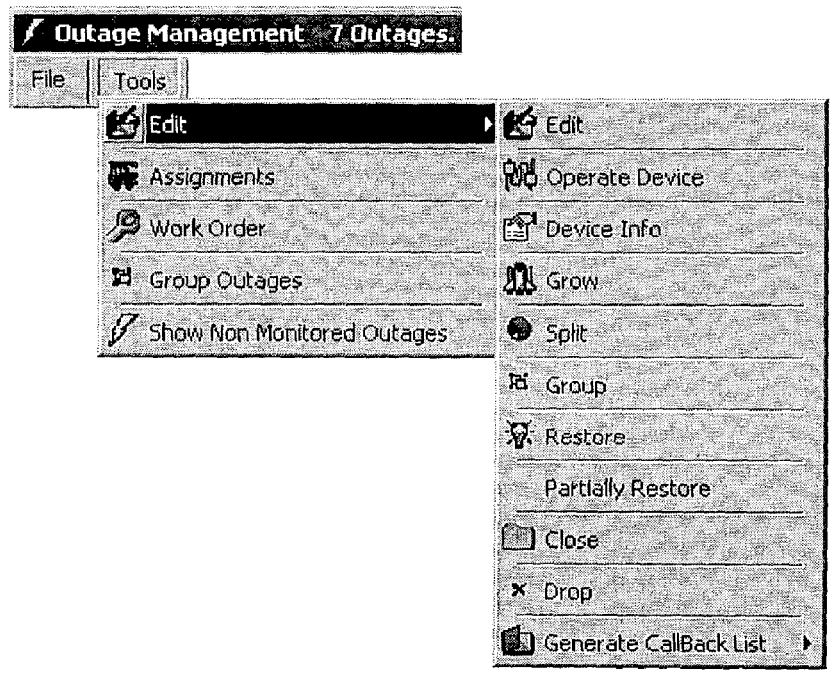

Most of the options under the Tools/Edit Menu are also available as buttons in the Toolbar in the Outage Management grid (FIG. 31). Some options are unique in the OM grid. For example, the Operate Device tab allows the user to do Switching on the Device associated with the Outage, if any. The Grow tab grows the selected outage to an up-line protective device. The user can choose which device to grow the outage to. The Split tab splits the selected outage into smaller individual outages. The user can choose which device(s) to split the outage to. The Group tab groups selected outages together into a single outage. The user can choose which device(s) to group the outages under. The Restore tab restores power to the selected outage. The Partially Restore tab restores power to part of an outage. The Drop tab drops the selected outage from the system.

The Auto Split Outage tab splits the outage into smaller outages automatically, by finding the nearest protective device and breaking the outage down into smaller outages. New outages are created down line of the outage and are automatically displayed on the map and in the Outage Management grid. The new outage(s) keep the same Creation Time and Date as the original outage, as well as the same status. The original outage is dropped from the system and is not put in Historical. The concept behind a split is that the original outage was predicted incorrectly and, therefore, needs to be split back to a previous state.

Figure 33:
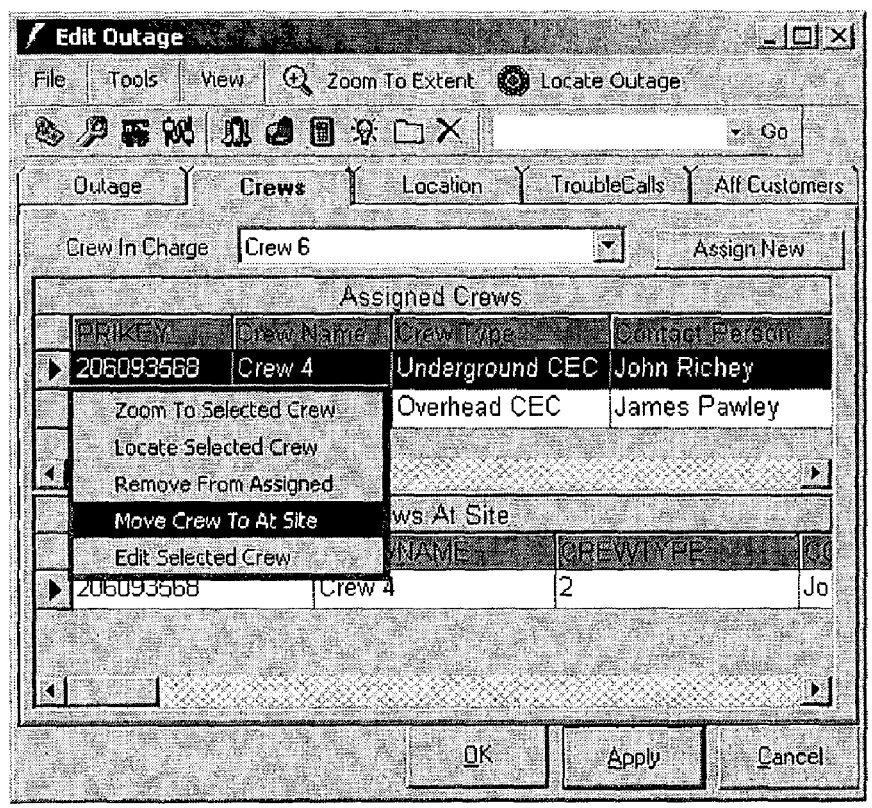
Figure 34:
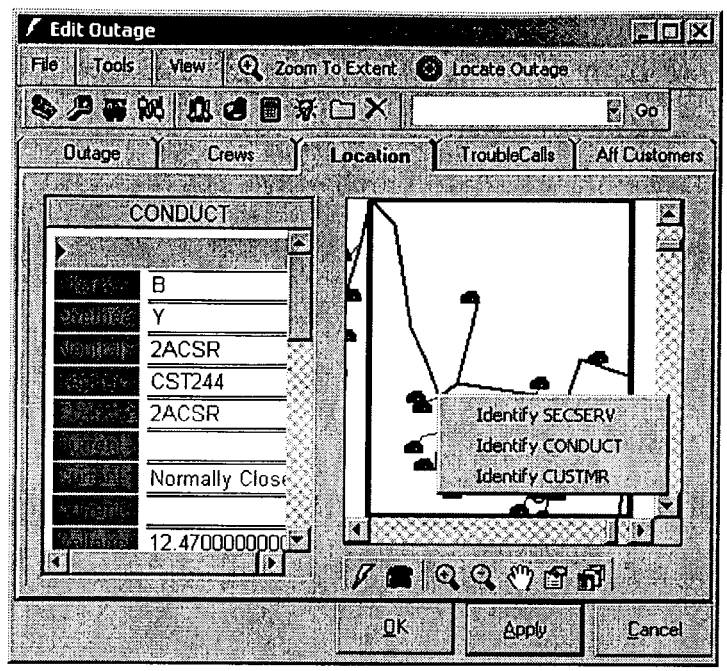

To put a Crew or Work Group at Site for the outage, right click on the desired Crew or Work Group in the top window and select Move Crew to At Site (FIG. 33) under the Edit Outage Screen. The Identify Map Feature tab allows the user to identify map features in the snapshot window (FIG. 34). To use this tool, select it and click on the map. A list of features in the area will be presented for the user to select from. Select the desired feature and the attributes for that feature will be shown in the window to the left in the form.

The Switching System gives the user the ability to perform switching on selected barriers, arcs or sources. It performs upstream and downstream traces to analyze and transfer loads. Upstream tracing can be used to find the first upstream device or all the devices in series up to the substation. Downstream tracing can be used to find all the downstream devices from a major device or to trace to the end of the feeder. The traces can also highlight the serviced area from any location on the feeder.

Figure 36:
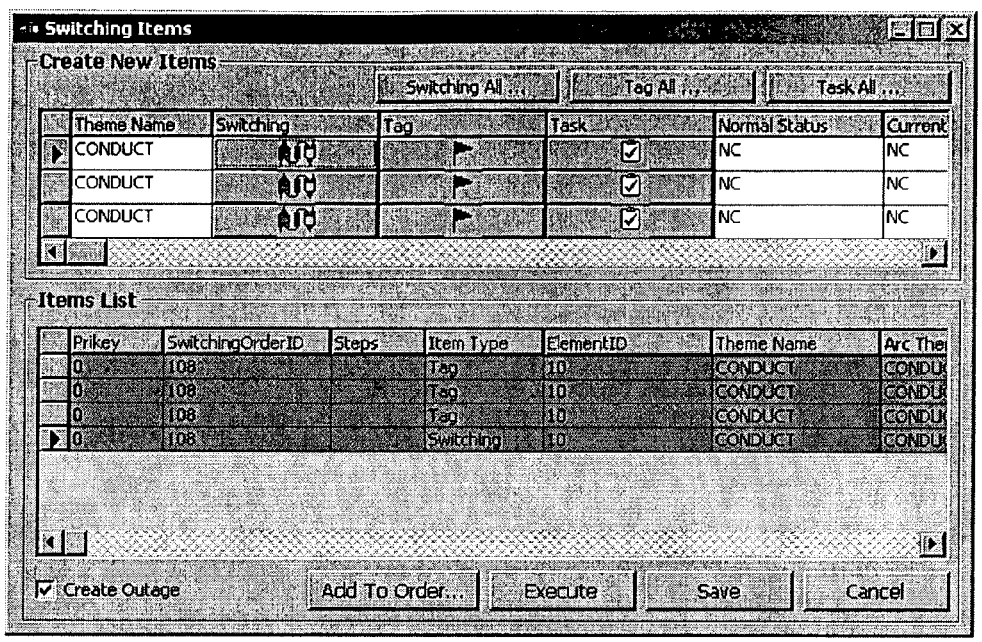

Switching scenarios are usually done from static models in engineering analysis packages in the prior art. Provided with appropriate permissions, a user can perform dynamic switching, set up and save Switching Order Templates, and even simulate a switching item or order before actually executing it. A Switching Items table (FIG. 36) is brought up when Switching is selected. The Switching Item table allows the user to change the status of the selected Conduct span by using a dropdown menu. If Switching is being performed on a Switch, the table will show the Switch information. If Switching is being performed on Conduct, the table will show Conduct information. The Tag Tool tab allows the user to tag a device or conduct span that switching is being performed on. The Task Tool tab allows the user to assign a task to the device or conduct span that switching is being performed on. As items are switched, tagged or assigned tasks, they are moved to the Items List portion of the Switching Items form.

If a two or three phase device or conduct span is selected for switching, each phase will be shown individually in the top column of the Switching Items form. The status of individual phases can be switched by clicking on the Switching tool as shown previously. In addition to changing the status of a switch or conduct line, a user can view or change all switches which have an abnormal status.

Figure 37A:
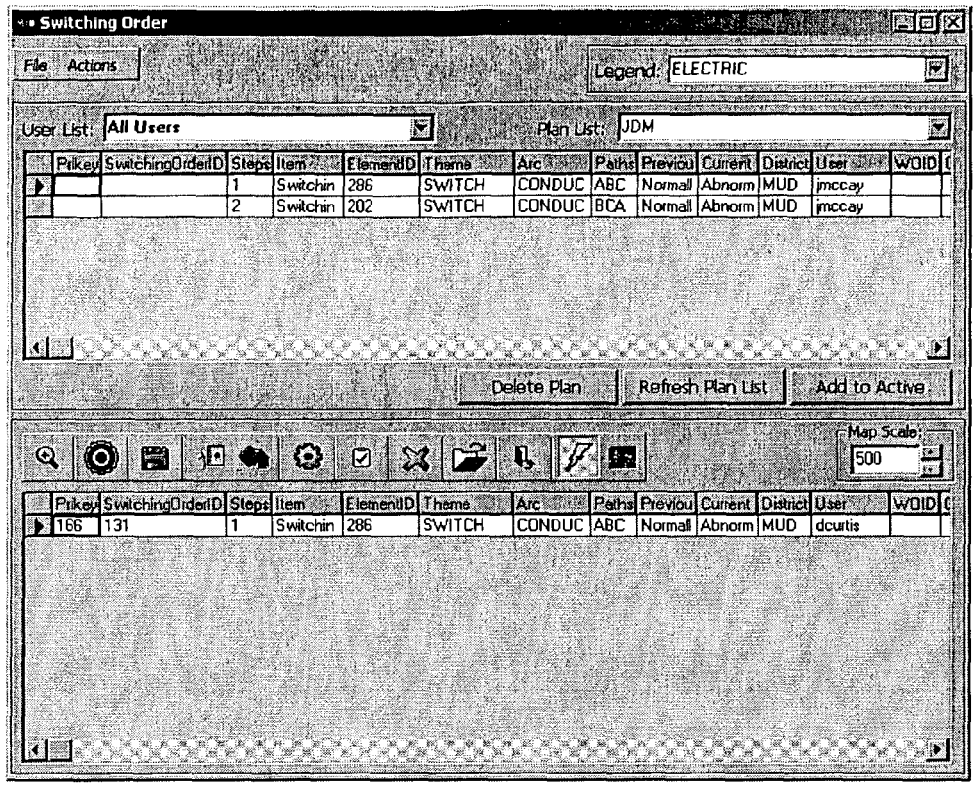
Figure 37B:
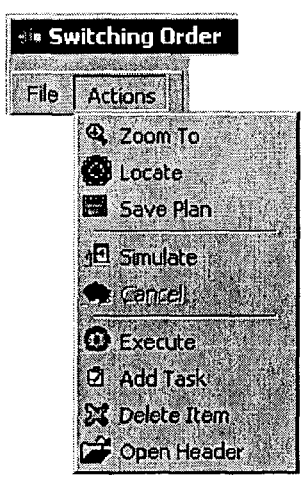

A Switching Order form (FIG. 37A) allows for advanced switching, including setting up switching scenarios and executing them in the desired order. Switching orders can also be saved and used again. The File Menu in the Switching Order form gives the option to Clear the active grid, Print the switching order or Exit the Switching Order form. The active grid is the bottom section of the Switching Order form. Any functions performed using the tools in the form will affect items in the active grid. The Actions Menu in the Switching Order form gives a dropdown with several tools to choose from. These same tools are available as buttons (FIG. 37B) in the form.

The UtilityCenter™ 10 handles switching with live data, and even in the field. Switching orders can be created that contain multiple switching actions and the switching actions can be simulated before they are actually executed. The Switching System also includes the ability to isolate barriers, arcs or sources, as well as add tags and tasks to a switching order. Switching order templates can be saved and used again if desired. The user can display a table containing all devices with Abnormal status and manage the Abnormal devices by zooming to and locating them on the map. The user can sort and group in the table for easier management of devices. Abnormal Switches can also be operated from the Abnormal Switch table. The uaDispatch supports performance of switching scenarios in the field. This provides field crews with the ability to quickly perform "what if" switching scenarios and identify the potential impact on the system prior to physically making the changes. The uaDispatch also supports multiple pre-defined switching order.

It is important to note that for a utility company which are using the uaField 100 and the uaDispatch 1490, the dispatcher or the dispatch system controls the status of switches and the conduct lines. Therefore, if a user changes the status of a switch in the uaField 100, this change will not be reflected in the master data the dispatcher uses. Conversely, when a dispatcher changes the status of a switch or a conduct line in the uaDispatch and executes the switching list, this will be reflected in the master data.

Figure 32:
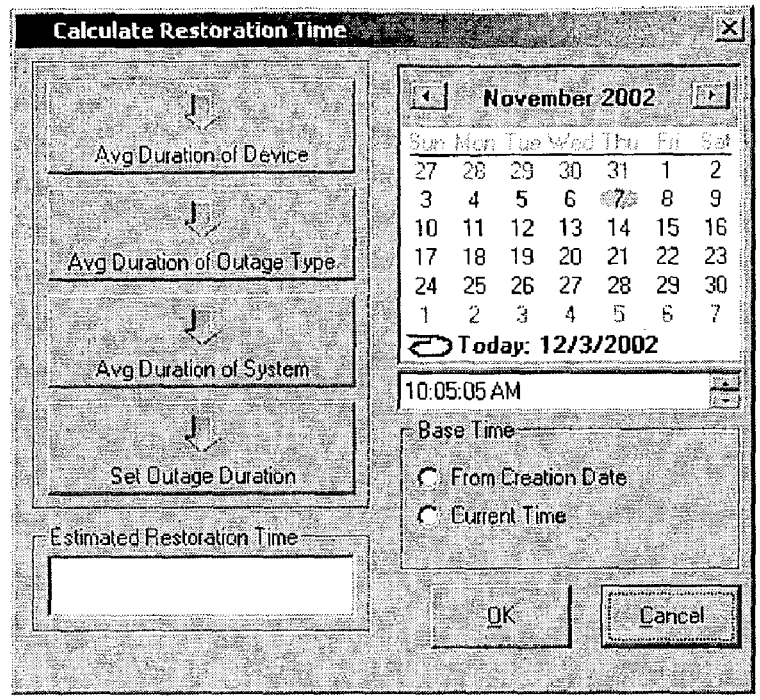

The system calculate estimated restoration time for the selected outage as instructed by a user by clicking on the Tool to get the Calculate Restoration Time form, shown in FIG. 32. This form allows the user to estimate the restoration time using different formulas, such as an average of the duration for the type of device that is out, or an average of the duration for the outage type, or an average of the duration for the entire system.

All GeoNetwork tracing functionality are supported as described in Module G1. The uaField™ 100 provides network tracing up and downstream from selected facilities to nearest protective device, switch or substation feeder. The uaField™ 100 also displays customers located along the trace along with usage totals, facilities information and other data. As mentioned, the uaField™ 100 gives user the ability to do switching "What-If" scenarios in the field, where it's needed the most. Crews have the entire, seamless system model at their fingertips. The power of having this functionality in the field allows supervisors to make better decisions faster.

Crews in the field can create outages on mobile computer to aid in restoration effort and quickly view affected equipment and properties. Created outages can be grown to include other faulted equipment and analyzed to view affected customers, verify connectivity and view information on system facilities including breakers, switches and fuses. Optional broadband wireless communication can provide transmission of outages to mobile truck computers where they are displayed in the field. This gives responding crews additional information concerning the outage and the ability to visualize locations, connected equipment and other information vital to the restoration process.

Figure 41:
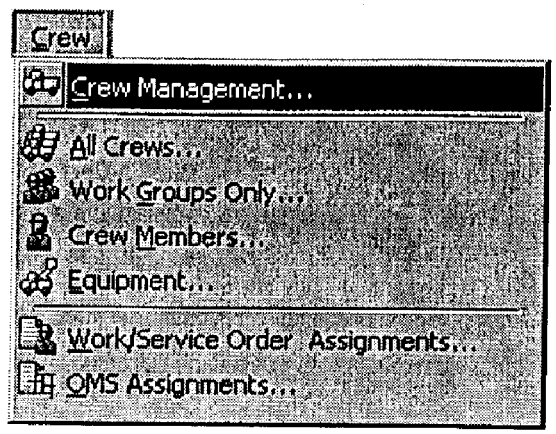
Figure 42:
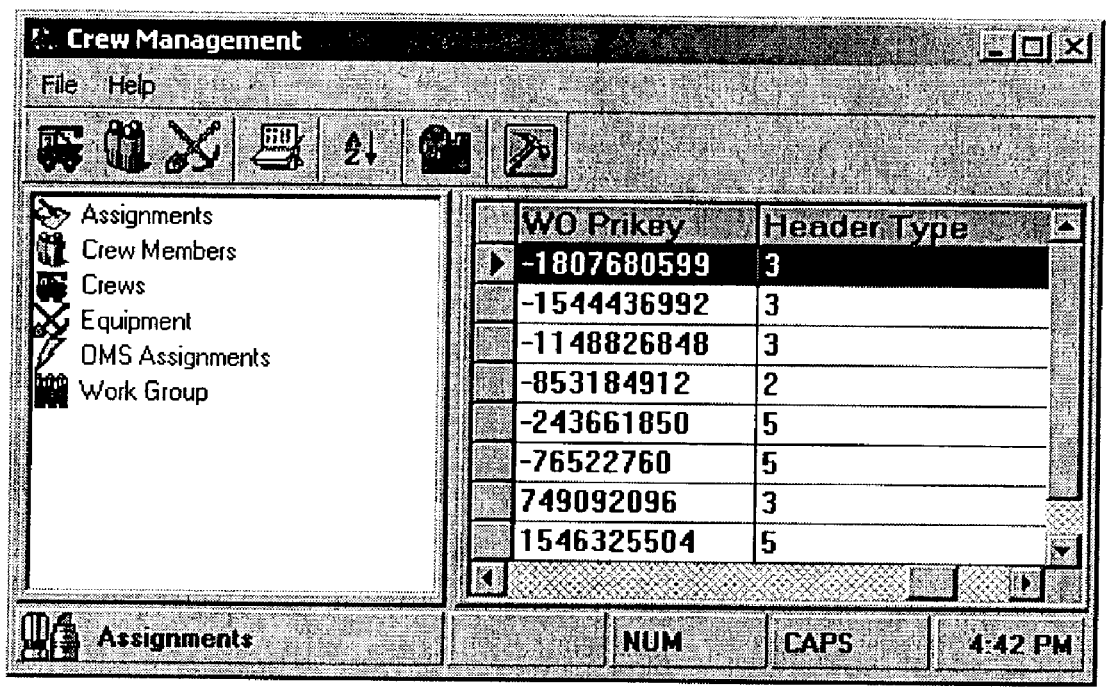
Figure 43:
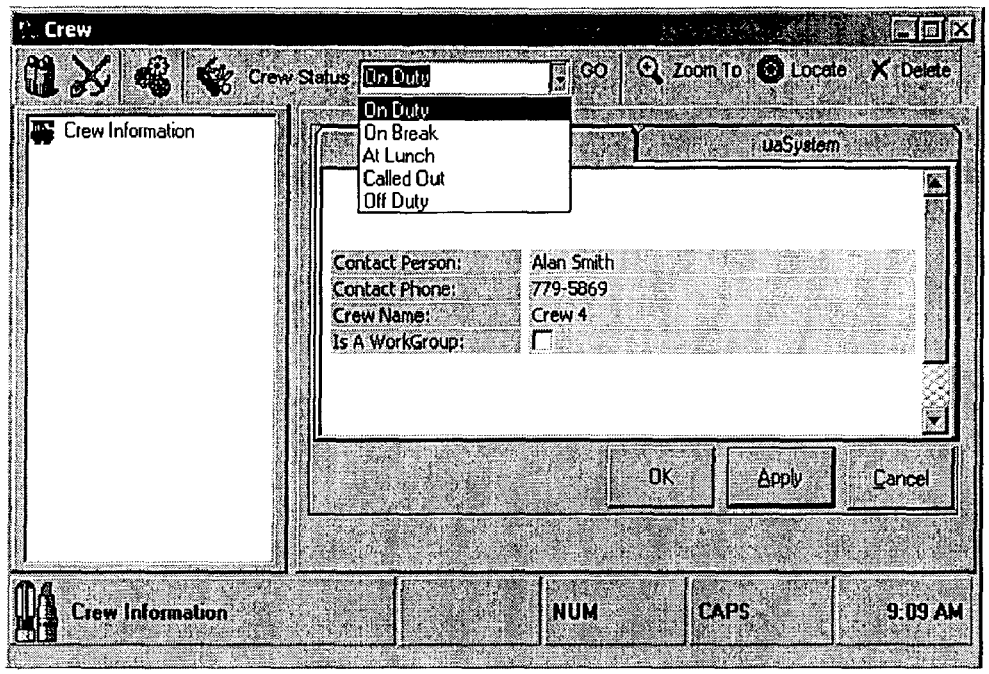

Clicking on the Crew Menu (FIG. 41) and selecting the Crew Management option brings the Crew Management Grid up (FIG. 42). Select the File menu can view and change grid layout, Preview or Print a listing for each item in the Crew Management grid, or Exit the grid. The Print Preview and Print options allow the user to Preview and Print listings for each category in the grid. The buttons at the top of the Crew Management grid allow the user to customize the grid and manage Crews and Equipment, among other things, such as add a new crew. The Crew Information table (FIG. 43) comes up when the Add New Crew button is selected. Fill in the information for the New Crew and select the Crew Status from the dropdown. Click Apply and OK to save changes, or Cancel to close the New Crew table without saving changes. A Show Skill Set for Crew tab shows the skill set for the Crew Members who are part of the Crew.

Figure 44:
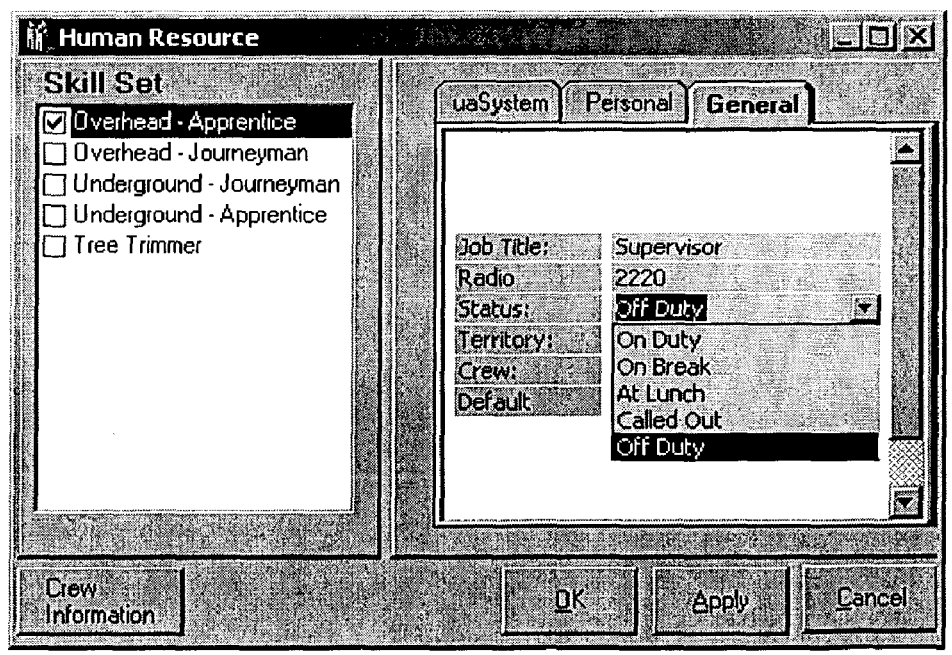

Clicking on the Add New Crew Member tool brings up the Human Resource form (FIG. 44) to show the crew's general or personal information, as well as skill sets.

Figure 45:
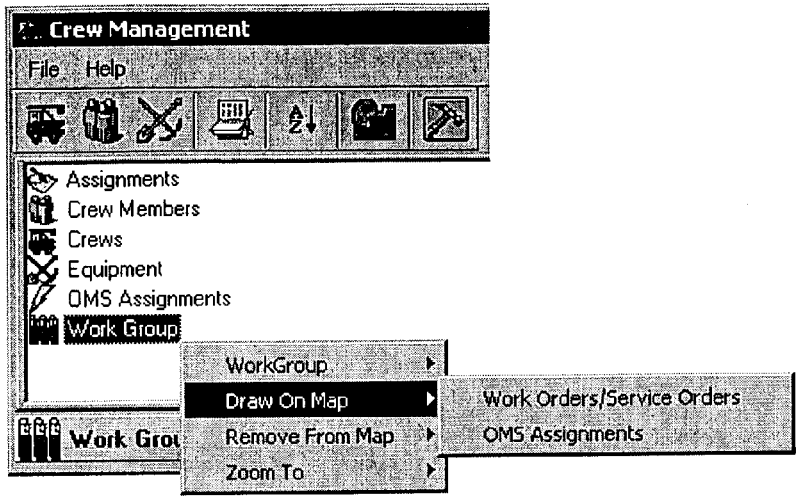

Under the Draw on Map option (FIG. 45), the Work Orders/Service Orders tab draws a polygon surrounding the area where the work orders/service orders are located. This is under the Crews Menu, so only work orders/service orders that have been assigned to a Crew will be drawn using this menu. The OMS Assignments tab draws a polygon surrounding the area where the Assigned Outages are located. This is under the Crews Menu, so only Outages that have been assigned to a Crew will be drawn using this menu. The user can right click on any individual feature in the Crew Management grid to get a list of options for that particular feature.

Figure 46:
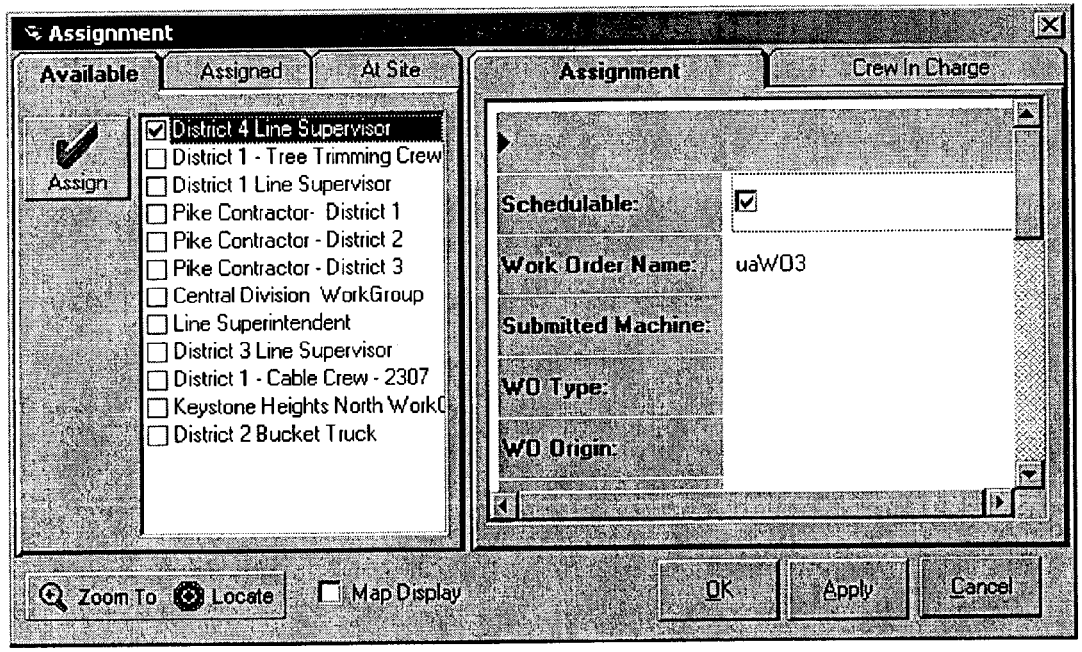

Select Assignments from the Crew Management grid to get a list of all the Work Orders in Proposed. Select an individual record in the window and right click to get the dropdown menu including Edit, Locate, Zoom To, Display, and Remove Form Map, for the selected record. Selecting the Edit option brings the Assignment table (FIG. 46) up. Below is a description of the buttons and menus available in the Assignment table, under the Available tab. There are three buttons under the Assigned tab: UnAssign, At Site, and In Charge. There are two buttons under the At Site tab: Remove and In Charge.

This module provides the following optional features: Interface to Telephony (i-Tel™), Interface to SCADA (i-SCADA™), and Interface to AMR (i-AMR™). The integration of Interactive Voice Response systems with the uaDispatch™ ensures that customer trouble calls are being accepted and processed as quickly as possible. Incoming calls are deployed into the OMS, automatically generating trouble calls onscreen and associating those calls with the proper outage. When power is restored, the uaDispatch™ calls via the i-Tel™ to customers and verify that power has been restored.

The integration of Supervisory Control and Data Acquisition (SCADA) systems enhances the automated control of remote equipment and provides for input of vital system information automatically into the uaDispatch™ 1490. The changes in the status of field equipment is displayed for the dispatchers and the managers via i-SCADA™, giving them the information needed to more effectively manage outage restoration.

The integration of Automatic Meter Reading systems provides an automated system of outage reporting and verification. By pinging meters along the suspected outage via i-AMR™, the dispatchers verify what customers are without power. AMR integration also provides the ability for meters to automatically report outages to the dispatchers before the customer has time to pick up the phone and call.

Figures 4, 5, 6:
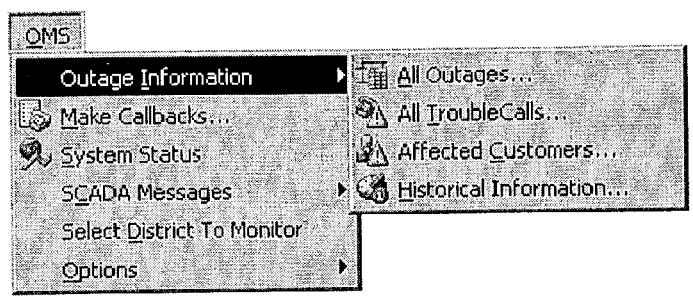

The OMS Menu in FIG. 4 gives a dropdown with several options for the OMS user to choose from. Following is a description of each option under the OMS Menu. The Outage Information option under the OMS Menu presents a dropdown for viewing All Outages, All TroubleCalls, Affected Customers and Historical Information. The Make CallBacks Menu under the OMS Menu brings the CallBack Listing grid up.

Figure 35:
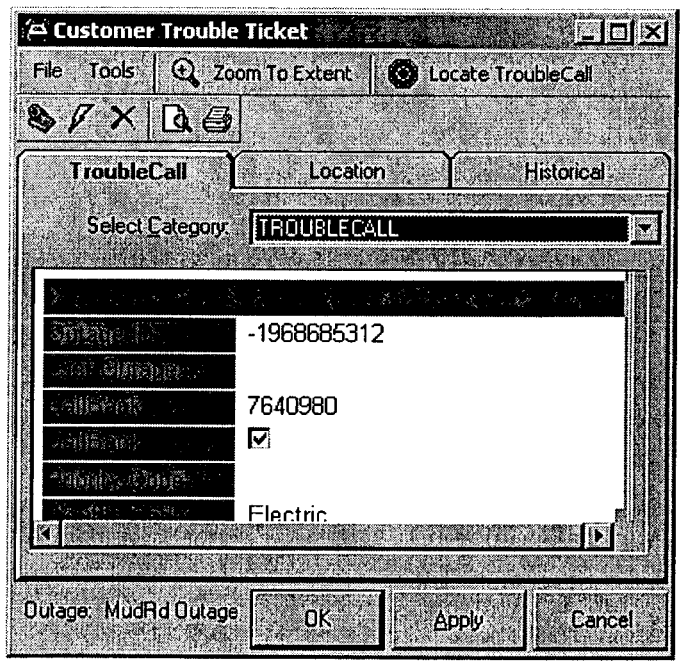

The Customer Trouble Ticket form (FIG. 35) can be accessed by several different methods, such as selecting a Trouble Call from the TroubleCall Management grid and select the Edit Selected TroubleCall tool. The Customer Trouble Ticket form gives options to change Grid Settings, Preview or Print the Trouble Ticket information, or Exit the Customer Trouble Ticket form.

The user can manually make call backs directly from UtilityCenter if they have the appropriate permissions. The System Status Menu under the OMS Menu brings the System Status form up.

The System Status form shows the current status of the OMS in FIG. 5, such as Number of Trouble Calls, Number of Outages, Number of Customers in Outages, etc. This form can be moved and resized and is refreshed based on the Refresh Rate in the form. The Refresh Rate of the System Status form is in seconds and can be adjusted to refresh anywhere from 1 second up to 300 seconds.

The SCADA Messages Menu under the OMS Menu allows the user to bring up and view SCADA Messages in FIG. 6.

Figure 7:
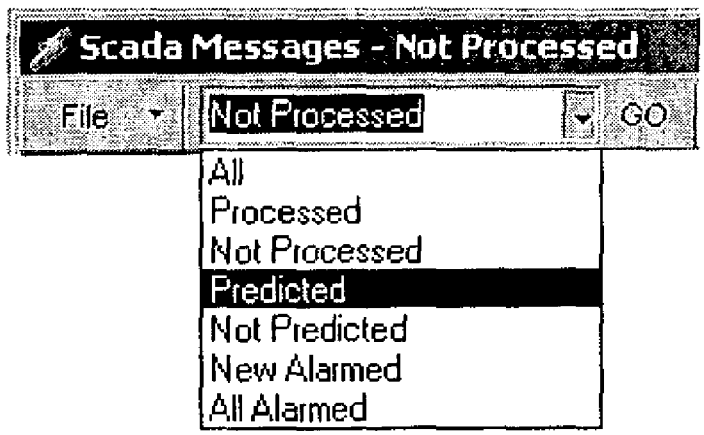

The user can bring up All SCADA Messages or only Alarmed SCADA Messages. The SCADA Messages grid in FIG. 7 allows the user to view different statuses of SCADA Messages by selecting from the dropdown window and selecting GO.

Figure 8:
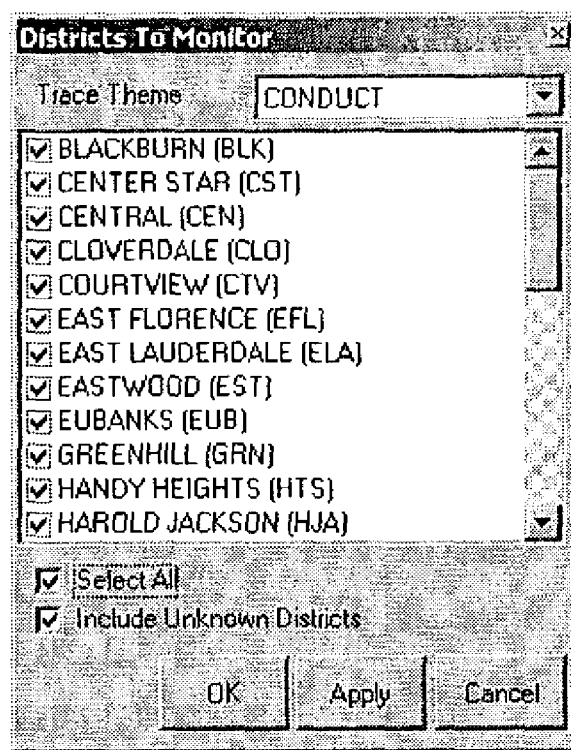

The Select Districts To Monitor Menu under the OMS Menu brings the Districts to Monitor table (FIG. 8) up. This table allows the user to set up districts to monitor for the OMS.

Trace Theme—The traceable Theme that will be used in Outage predictions. With the appropriate permissions, users can specify what Districts to Monitor and set up which type of Utility to Monitor, (Electric, Gas, Water, etc.).

The Select All box can be checked to quickly select all Districts. Include Unknown Districts, if checked, allows the user to see Miscellaneous Ticket outages. Miscellaneous Tickets are outages that are created when customers that are not on the map call in. If these customers are in the Customer Information System (CIS), they will be put in an outage called a Miscellaneous Ticket. The user can choose whether to see Miscellaneous Ticket outages or not.

Figure 9:
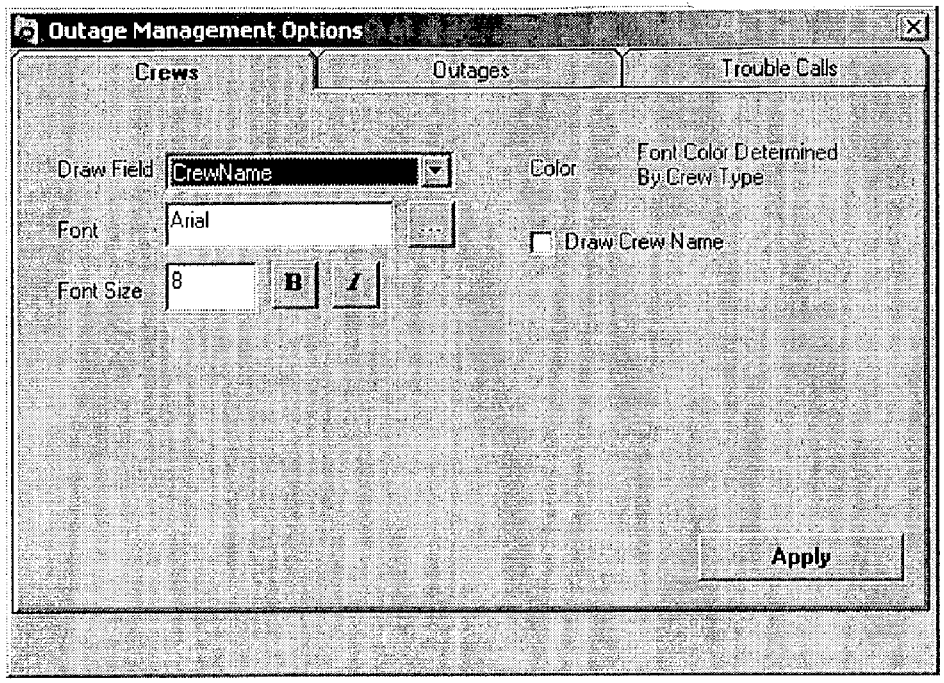

There are three tabs in the Outage Management Options form; Crews, Outages, and Trouble Calls. The Crews tab (FIG. 9) in the Outage Management Options form allows the user to set the symbology for Crews. When a Crew is put "At Site" for an outage or WorkOrder, the Crew symbol will appear on the map. The Outages tab (FIG. 10) in the Outage Management Options form allows the user to customize many options dealing with outages in the OMS. The Trouble Calls tab (FIG. 11) in the Outage Management Options form allows the user to customize many options dealing with Trouble Calls in the OMS.

As crews are assigned to outage locations, a corresponding truck icon appears onscreen at that location. Information regarding the crew, onboard equipment, and truck type are including in menus associated with the truck icon. As the crew responds to the outage, dispatchers can manually enter location changes and move the crew to the next assignment. Dispatchers can easily edit the location assignment and tools/equipment available based on the changing status of the current outage situations. This provides managers with up-to-date information concerning where crews are working, the equipment and tools they have available and who is in the best position to respond to additional calls fastest. All assigned crews are displayed onscreen in both the dispatch center as well as desktops running the uaDispatch™ throughout the utility. As crew location and status changes, dispatchers can update the location along with any changes in equipment or tools available.

The uaDispatch™ allows the dispatchers and the managers the ability to choose which crews are to be monitored by the crew management system. This capability is especially beneficial for large systems with multiple districts assigned to individual managers or dispatchers. Managers working only in specific districts can also specify the territory to be monitored. In large systems with multiple districts, this provides the maximum efficiency for dispatchers and managers assigned to specific territories by providing only the information related to those areas.

Figure 10:
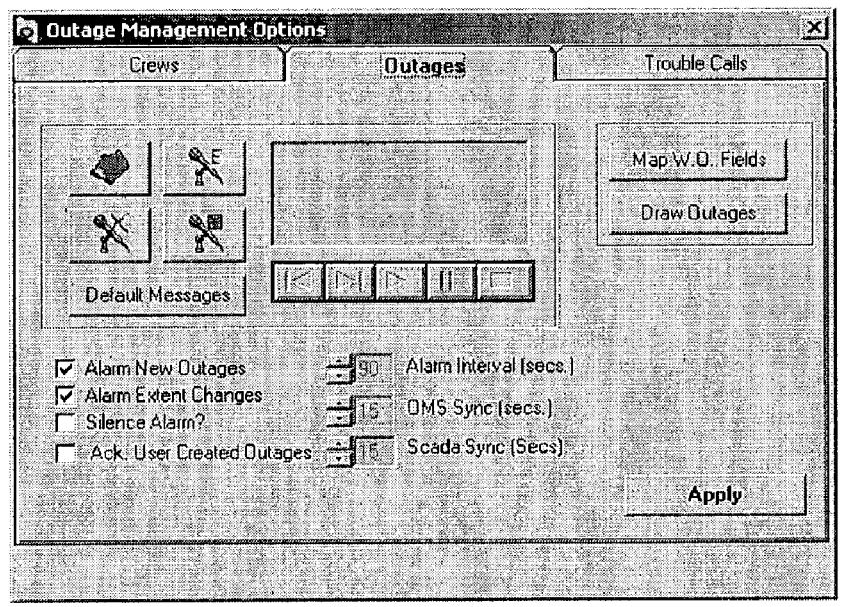
Figure 13:
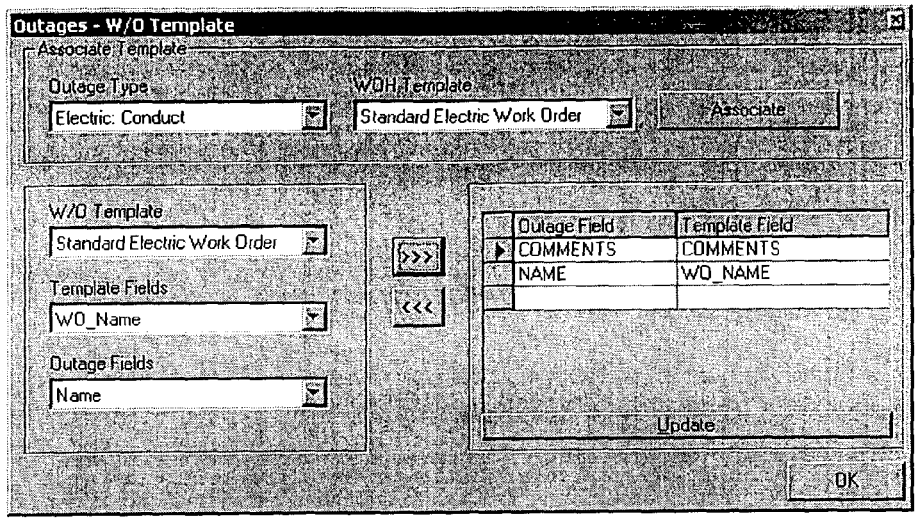

The Map WorkOrder Fields icon in the right side of the Outage tab in FIG. 10 allows the user to set up Work Order templates for Outages and match fields from the Outage table to the Work Order Header table. If a dispatcher creates a Work Order Header while working an outage, the fields from the Outage table can automatically be pushed over to the Work Order Header fields. FIG. 13 shows a Work Order Template. From this table the user can set up Work Order Header Templates for creating Work Order Headers associated with an outage. This form allows the user to Associate a Work Order type with an Outage type, and automatically populate fields in the Work Order Header with information from fields in the Outage. This allows the Dispatcher to go ahead and start a Work Order Header for an outage, and have information from the Outage go directly into the Work Order Header. Work Order Headers that are created by dispatchers can be submitted to Proposed and then used by linemen, staking engineers, etc. The user can select an Outage Type and a WOH Template from the dropdown menus and associate them to each other. This allows the user to set up templates for each outage type and already have the Work Order Header template ready when a Work Order Header is generated. In the example above, all Electric: Transformer outages will default to the Standard Electric Work Order Header if a work order header is generated by the OMS user. See the section on the Outage Management grid and the Edit Outage form for instructions on generating a Work Order Header. After Selecting the Outage Type and the WHO Template type, click Associate to associate them. After associating the desired Outage Type and the WHO Template type, select the Work Order type from the W/O Template dropdown. After selecting the Work Order type, a list of all the fields in the selected Work Order will be shown in the Template Fields dropdown. All the fields in the Outage table will be shown in the Outage Fields dropdown. This allows the user to match fields from the Outage table to fields in the selected Work Order Header table, and have information populated in the Outage table come directly over to the Work Order Header table.

Figure 12:
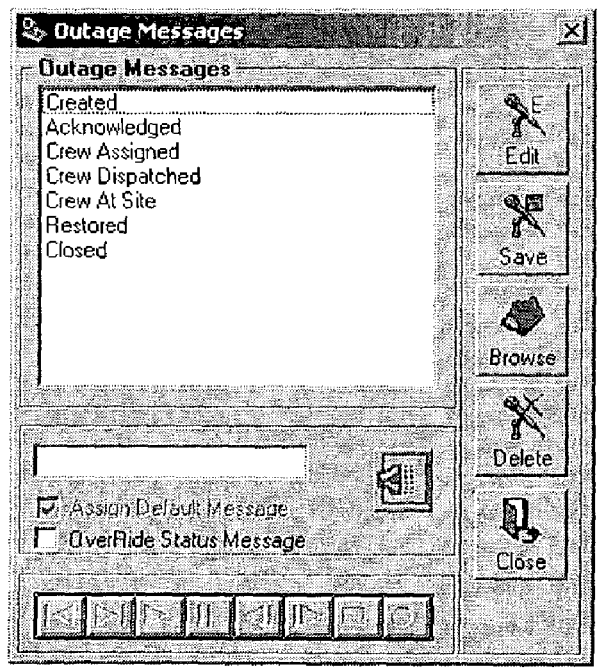

The Outage Messages form in FIG. 12 allows the user to create and set default messages for an IVR to play back to customers that call in after an outage has been created. The user can create different messages depending on the outage status. By checking the OverRide Status Message box, the user can customize a message to play regardless of the outage status. The user needs a computer microphone to record the messages, which will be played back by the IVR when customers call in. The seven OMS settings shown at the bottom of FIG. 10, under the Outages tab in the Outage Management Options form, can be customized at the user's discretion.

Alarm New Outages—If checked, sounds an alarm when new outages come in.

Alarm Extent Changes—If checked, sounds an alarm if extents are changed for any OMS themes in UtilityCenter.

Silence Alarm?—If checked, silences the alarm that sounds for new outages.

Ack. User Created Outages—If checked, automatically changes User created outages to a status of Acknowledged.

Alarm Interval—Determines the Outage Alarm Interval.

OMS Sync—Determines how often the OMS Synchronizes on the user's computer. The OMS Database may not be located on the computer that is using uaDispatch, so the OMS will need to Sync, (update), at an interval determined by this setting.

SCADA Sync—Determines how often the SCADA Interface synchronizes.

Figure 11:
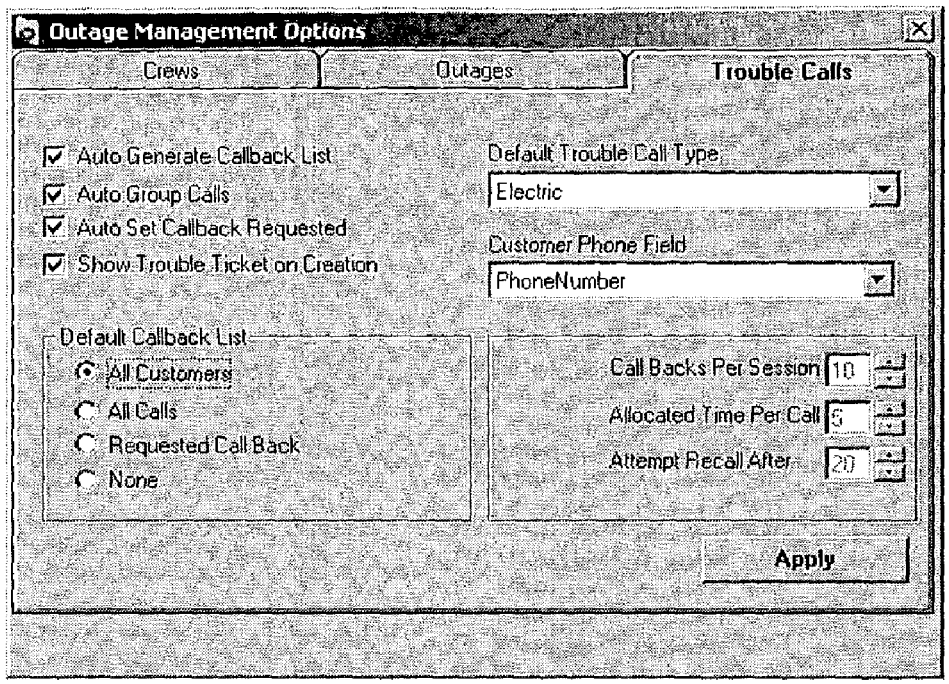

Calls received by CSR Customer Call Processing™s via direct-dial numbers, IVR overflow or other avenues are processed by CSRs and input directly into the OMS database via the Trouble calls tab in FIG. 11 or an e-CallCenter 1560, a web-based application. Any computer having internet browser capability can then be used for call handling. This functionality provides for the ability to grow and shrink resources as necessary when those unexpected emergency situations arise.

As calls are received and processed, the uaDispatch™ groups calls according to the common protective device (e.g., switches, fuses, reclosers for electric networks or valves and regulators for gas and water) to create outages at that location. As additional calls are received, the outage can be "grown" to include other protective devices.

Each call received is analyzed by the uaDispatch™ and assigned to a particular outage based on its location and the connectivity of the facilities from which it is served. A powerful prediction engine, uaPredictionEngine™ 1480 constantly analyzes all calls to determine which piece of equipment has failed and caused the outage based upon Customer-defined Rulebase 1430. As additional calls come in, those predictions are revisited and updated according to the most recent information.

As calls are received by the uaDispatch™ 1490, color-codes alert dispatchers as to the current status of each outage. The color codes reference (1) pending outages which are assigned with crews and (2) those restored and in progress of customer callbacks. Settings are defined by the user so each dispatcher knows at a glance the current status of each outage. Information concerning all outages in progress is also available in tabular displays to present a synopsis of the current situation to the dispatchers and the managers. The outages are grouped, sorted, and prioritized based on user-defined criteria, which provides the managers the information necessary for assigning crews and for managing the outage restoration process.

With uaDispatch™'s Message Center (not shown) functionality, information can be passed internally in the utility company from user to user electronically. Instant notification of the message is displayed onscreen so the user can access it quickly and put the information to use in the restoration process.

Figure 38A:
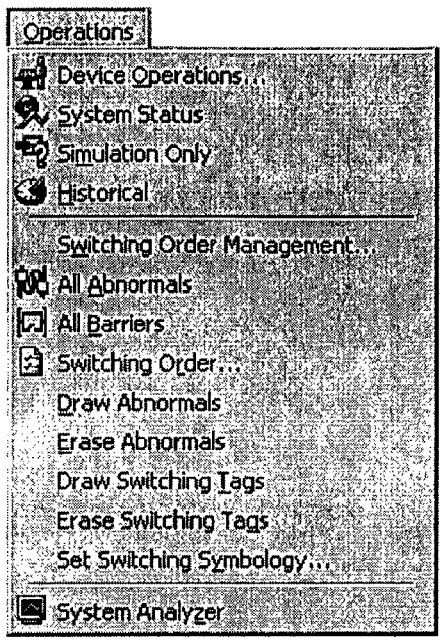
Figure 38B:
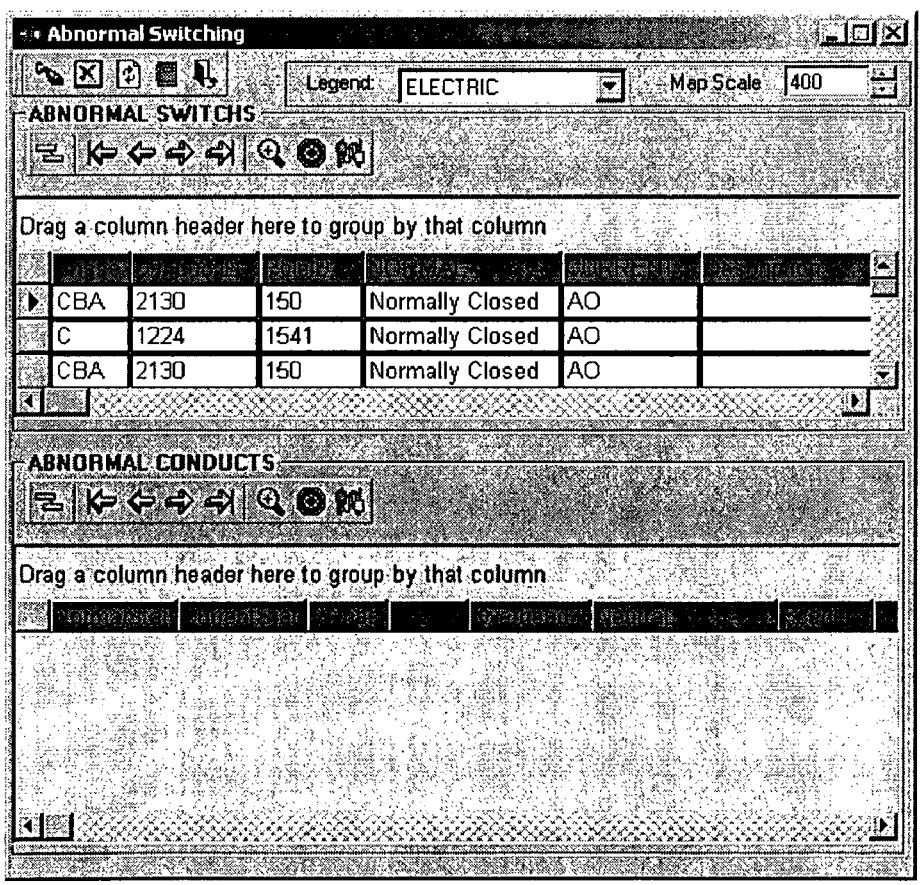

In short, the uaDispatch™ includes the following functions:

Reads calls from manual entry or TVR
Lists all calls by user defined sorts
Lists customers affected by outages
Lists all predicted failed devices
Graphically displays all calls and predicted outages
Creates trouble tickets and assign crews
Outages color-coded by status
Graphically displays all crew assignments
CSRs have access to map showing outages
Zoom to individual outages
Manage Resources
Logs outage start, acknowledged, arrival, and restoration times
Provides caller notification from known outage areas
Provides customer call back list
CSRs can view outage history
Dynamic feeder switching
Handles partial restoration The Operations Menu (FIG. 38A) gives the user several tools and capabilities for use with the OMS. For example, the System Status form shows the current status of the OMS such as Number of Trouble Calls, Number of Outages, Number of Customers in Outages, etc. This form can be moved and resized and is refreshed based on the Refresh Rate in the form. The Refresh Rate of the System Status form is in seconds and can be adjusted to refresh anywhere from 1 second up to 300 seconds. As another example, the All Abnormals tab brings up the Abnormal Switching grid (FIG. 38B), which contains all switches and conduct spans with an Abnormal status, (Abnormally Open, Abnormally Closed), etc.

The buttons and menus in the Abnormal Switching grid include (1) a Grouping or Sorting Tool which opens the Group By/Sort Table and allows the user to group by or sort columns in the Abnormal Switching grid; (2) a Draw all Abnormal Switching Elements tool; (3) a Erase all Abnormals from the map tool; (4) a Report tab which generates a report for all Abnormal elements in the Abnormal Switching grid; (5) a All Barriers tab which brings up a grid (FIG. 39) displaying all barriers/switches in the system.

From the All Barriers grid, the user can select on individual barriers and perform the same functions that were discussed previously in the Abnormal Switching grid. Two additional function that can be performed from the Display All Barriers/Switches grid is (1) Isolation which opens the Switching Order form and allows the user to isolate the selected barrier; and (2) System Analyzer.

The System Analyzer (FIG. 40) allows users to retrieve information from the OMS database, including Historical data as well as the Existing database. Users can run reports for individual Substations and/or feeders and generate Feature and Post Outage Management listings and calculations. These listings can be exported to text or Excel formats. When the System Analyzer is activated, all substations will be listed in the left side of the form. Double-click on a substation to expand and show all the feeders on it.

The System Analyzer runs a series of queries as defined by the user from the selected substations or feeders. All substations and feeders for the entire system can be quickly selected by choosing the box at the bottom left of the form. There are two categories of queries: (1) Current System Calculations, which are run on the data in the Existing database and (2) Post Outage Management, which are run against OMS Historical Information. As set in FIG. 40, the Current System Calculation reports show general information for the Existing database, such as total number of Barriers, total number of Customers, etc., and the Post Outage Management reports show information for the OMS, such as total number of Outages, Reliability Indices, etc. for the selected Substations or feeders.

For Reliability Indices, the user has the ability to choose the time frame for the reports. Simply click on the Start Time browser and choose a date and time and then do the same for the End Time. Using these tools, the user can run Reliability Indices reports on specific Substations or Feeders for specific time periods.

The bottom part of the System Analyzer form allows the user to run reports on connected themes in the system. The Filter option allows the user to define queries and specify what information to include in the reports. Select Go to run the report.

Module G-6 Engineering Analysis Integrated Solution

The UtilityCenter™ 10's System Planning Solution is seamlessly integrated with third-party engineering analysis software, providing a powerful planning tool that uses accurate, up-to-date system information for projections, system growth studies and other planning. An Interface to System Planning, i-PLAN™ (not shown), is connected to existing third-party engineering analysis and planning software packages, providing seamless data exchange between GIS and the planning system to enhance system growth studies and future projections through use of current system information. Current system usage information is obtained through integration with the existing Customer Information and Billing System, making planning projections more accurate and reliable. The ability to perform studies in-house also reduces the need for outside consulting services.

Module G-7 Computer Maintenance Management Solution

The UtilityCenter™ 10's Field Operations Solution tracks and updates a variety of operations functions within the day-to-day workflow of utilities. It tracks all job orders, assigned resources, schedule dates and other information associated with the job from beginning to completion.

From maintenance to pole inspection to ROW, information from the field is input directly into the GIS 900 where managers can easily access updates and generate reports for management, boards and regulatory agencies. The Computerized Maintenance Management—uaCMMS™ (within the Dispatch and Crew Management system 200) gives managers a powerful tool to manage and track maintenance schedules throughout the utility system. Because the GIS 900 contains historical system facility information, managers can easily query the system to determine preventive maintenance schedules and add maintenance in an efficient manner. Maintenance information is entered into the GIS 900 and archived for future reference and planning.

Pole inspection results are entered into the GIS 900 and queried to determine replacement or repair cycles. Inspection results can be entered at the pole through mobile computers or handheld units, then synched with the GIS 900 so results are automatically available enterprise-wide. Additional notes or information can also be entered and made available in Monthly Substation Inspections and Reports.

As code violations are found throughout the system, field crews can quickly note the location and nature of any potential violation into mobile laptop computers or handheld units. This Equipment Maintenance Management information is automatically updated in the GIS 900 when the mobile units are synched with the LAN, ensuring that managers can schedule necessary repairs or modifications.

ROW tree trimming cycles are tracked and maintained easily in the GIS 900. Initial ROW cycles are entered into the GIS 900 and viewed on-screen and color-coded to reflect projected schedules. Information regarding assigned contract or internal crews, situations, clean-up and clearing methods are stored in the system. Customers located in the current area being cleared are notified by mail or phone by simply tracing the affected circuit, generating a call or mail list and sending out notifications prior to the beginning of the cycle.

Module G-8 Field Services Solution

The UtilityCenter™ 10's Field Services Solution tracks and updates a variety of operations functions within the day-to-day workflow of utilities. From pole inspection to service order tracking, information from the field is input directly into the GIS 900 where managers can easily access updates and generate reports for management, boards and regulatory agencies.

As mentioned, pole inspection results and code violations can be entered into the GIS 900 and queried to determine replacement or repair cycles. Inspection results can be entered at the pole through mobile computers or handheld units, then synched with the GIS 900 so results are automatically available enterprise-wide. Additional notes or information can also be entered and made available. Periodic inspections of underground facilities can be logged into GIS 900 for quick access by managers, foremen and others to schedule maintenance, repairs and replacement more efficiently.

Service orders entered into the GIS 900 daily are easily tracked and updated as servicemen complete sets and removes, cutoffs and other daily work. Reports tracking the efficiency of crews, status of orders and other vital information can be generated quickly.

Module G-9 ROW Maintenance Solution

The UtilityCenter™ 10's Right Of Way (ROW) Maintenance Solution provides a powerful tool for accurately and graphically recording ROW conditions, setting trim cycles and maintaining ROW in the most efficient manner possible. ROW trimming and vegetation management cycles can be input into GIS 900 for easy manipulation and monitoring. Managers and foremen can access information graphically and use the system to more efficiently manage crews.

Module G-10 Mobile Data/AVL Solution

The UtilityCenter™ 10's Mobile Data/AVL Solution is the industry's first true Mobile Crew Management system providing near-real-time tracking of crew locations and wireless messaging between dispatch and field computers. AVL data is automatically integrated with all the components, such as OMS/Dispatch, Work Management, Web Interfaces, etc. In other words, AVL data is integrated with a comprehensive utility management suite. The system is AVL vendor independent such that it supports radio, cellular, satellite, or spread spectrum radio for location info and remote messaging.

The system solves the problem of poor radio signal strength or unavailability of cellular signal through optional use of satellite transmission when needed. The Mobile Crew Management: uaMCM™ (within the Dispatch and Crew Management system 200) gives dispatchers the ability to view the current status of crews on-screen. Information available includes what crew members are assigned to that truck, the equipment available to the crew, current job assigned and current location.

An Interface to Third-Party Wireless Network, i-MDS™ (not shown), provides the foundation for tracking of crew locations as well as the ability to communicate wirelessly with crews in the field. Optional use of alternating cellular/satellite transmission ensures communication and tracking ability—even when crews are in areas where there is no cellular or radio coverage. An Automatic Vehicle Location Interface, i-AVL™ (not shown) integrates the visually track crews in near-real-time data 1620 into the GIS 900, displaying crew locations on your seamless, electronic map. Location updates are available from one to ten minutes, giving dispatchers the ability to know where crews are located and which crew is in the best position to respond most efficiently to trouble or service calls.

An Automatic Emergency Notification, uaAlert™ 1470 is an emergency notification button carried on the crewman's person at all times. When emergencies arise and radio communication is not possible, the crewman can notify dispatch by pressing the uaAlert™ 1470 button.

Module G-11 Decision Support/Reports Solution

The UtilityCenter™ 10's Decision Support/Reports Solution provides managers with unparalleled ability to customize and generate the reports needed to keep boards, staff, employees and others informed of system performance, efficiencies, budgetary status and other vital data needed to make daily work more efficient.

The web-enabled e-Reports™ 1510 provides customized report generate via the Web. By logging into the system via secure internet or intranet connection, authorized employees can produce customized recurring or on-the-fly reports detailing the information needed. The arduous task of preparing monthly board reports is made much simpler through the e-Reports™ 1510. Recurring monthly reports are generated quickly due to the seamless integration of customer information and billing data and requests by board members or regulatory bodies for customized reports can be quickly fulfilled.

Departmental managers have the unique ability to easily customize the reports they need for budget tracking, work order tracking, materials management and other processes. Generate facility reports detailing system facility information are also quickly and easily prepared. Reports can detail maintenance schedules, facility condition, repair or replacement schedules, ROW scheduling, historical device reliability indices and other information.

The integration of custom data can provide invaluable reports for marketing of value-added services. Demographic customer information, energy choices, age and type of HVAC and water heating equipment, etc. are entered or imported into the GIS 900 and attached to the customer's graphical representation. Then, the GIS 900 can be queried to produce mail, phone lists, or reports for marketing of utility products and services.

The e-Reports™ 1510 is fully customizable by authorized employees to produce reports detailing the specific information desired. Because the UtilityCenter™ 10 utilizes a SQL Server, data is easily manipulated and tailored to the unique needs of individual departments and users. Users can easily perform ad-hoc database inquiries to extract the specific information needed for the task at hand. Once reports are generated, data can be exported to popular formats such as Excel, Word or MDB for more efficient dissemination to the parties needing the information.

Module G-12 Document Management Solution

The UtilityCenter™ 10's Document Management Solution is an innovative feature allowing users to link vital data and images to the graphical features in the GIS 900.

A Document Manager: uaDocumentManager™ 1440 provides linkage of a variety of information to the graphical features displayed in the client's GIS. Scanned or digital photographs of facilities, scanned schematic diagrams and customer documentation, links to supplier's web pages and other files can be accessed through the GIS 900 by clicking on the selected feature and opening the desired file. This functionality is extremely beneficial when researching equipment specs, historical documentation or visual verification.

The uaDocumentManager™ 1440 gives users the ability to scan photographs, schematics and other hard-copy documents and link those digital images to specific facilities within the GIS 900. As images are stored and linked, users can perform searches to find any images needed. Links to vendor websites are also attached to specific facilities, allowing users to quickly access product information, specifications, updates and other information via the Web. All images are linked to their original application, automatically launching Word, Excel and other programs for viewing, editing and manipulation of the linked image or document.

Module G-13 One Call Solution

The UtilityCenter™ 10's One Call Solution gives the utility the ability to quickly respond to requests for line locates through integration with existing one-call providers. The web-enabled e-Reports™ 1510 provides customized report generate via the Web. By logging into the system via secure internet or intranet connection via one call, a feature uaOneCall™, and a custom interface i-OCS within the interface group 1300). Authorized employees can produce customized recurring or on-the-fly reports detailing the information needed. UAI's web-enabled e-Reports™ 1510 provides customized report generate via the Web. By logging into the system via secure internet or intranet connection, authorized employees can produce customized recurring or on-the-fly reports detailing the information needed via an Interface to One Call System.

Module G-14 Field GPS Inventory Solution

Data are collected from the filed via uaGPS™ 1460 into the uaField™ 100, such a data integration makes it easy to verify facilities location and other information directly into the GIS 900. Changes can be made to the GIS 900 to reflect accurate location and shared among all users.

Trace Caches and Outage Prediction

The key to the UtilityCenter™ 10's fast switching and fast outage prediction is in the construction of in memory trace caches which are built when the application starts up and can be rebuild "on the fly" when switching changes are made. By tracking and caching incremental data changes as they occur and replicating these changes to all other computers, each computer in the system synchronizes with the rest of the system. For those field computers (laptops), they perform all sorts of system operation while being disconnected from the central network in the field and to have these operations transparently synchronized with the rest of the system once reconnected.

Figure 54:
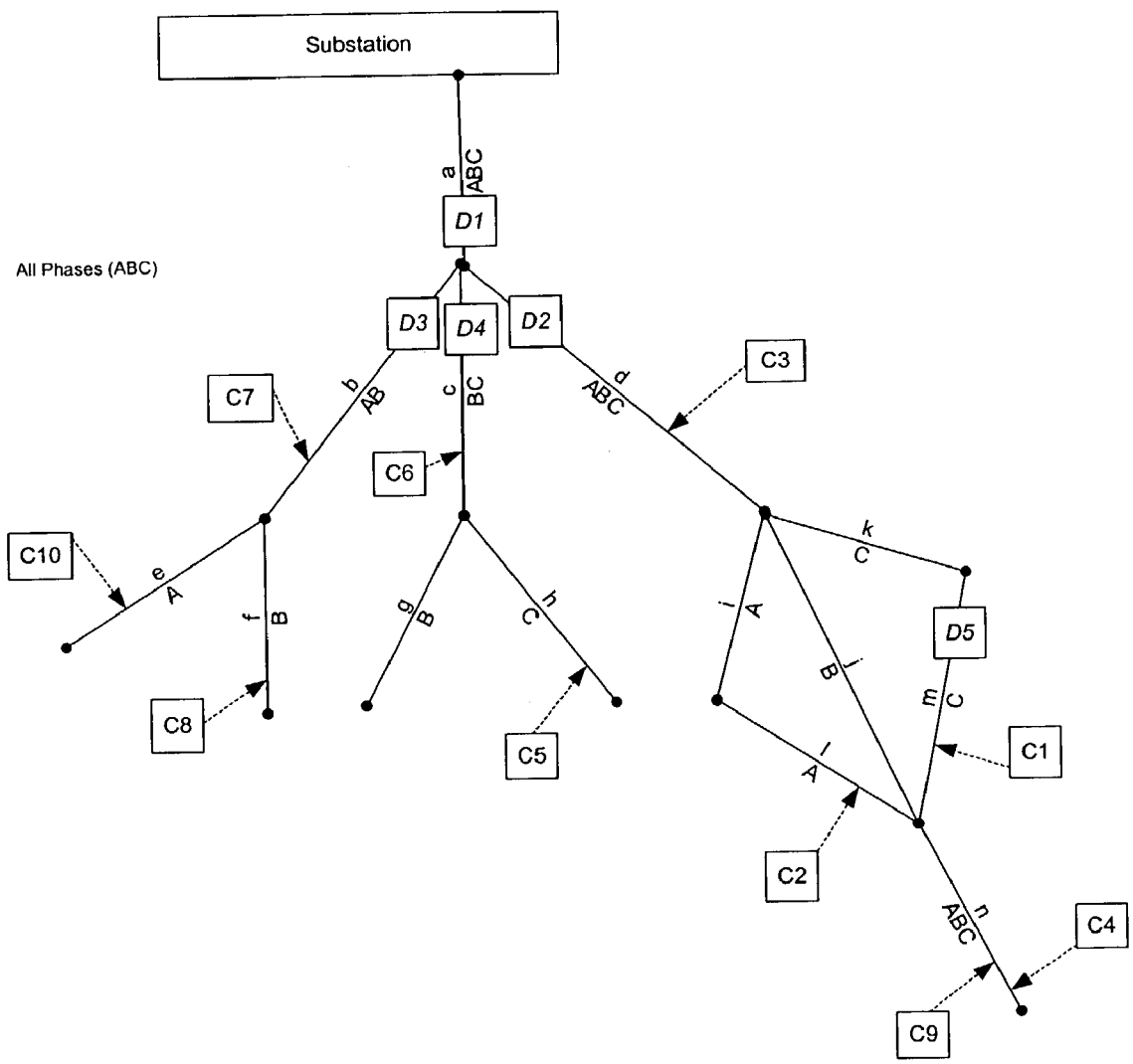
FIG. 54 shows a simplified network diagram of a portion of a three-phase electric distribution network.

FIG. 54 shows a simplified network diagram of a portion of a three-phase electric distribution network. Certain details, such as switches and transformers, are omitted. Solid line segments (e.g., a, b, c, . . . ) show conductor spans. Each segment, or arc, of conductor is labeled with a Conduct ID (a, b, c, . . . ) and by which electrical phase is carried by the line (ABC, B, AB, . . . ). Dotted lines between conductors and customers (C1, C2, . . . ) are secondary service lines. Transformers connecting secondary service to conductors are implied. In-line protective devices (D1, D2, . . . ) are drawn on top of the conductor spans protected by the devices.

Utilities, for the most part, prefer to map and model their electrical distribution systems with single lines, where each line has attributes designating which electrical phases are being served. In the real world, for example, a three-phase line consists of four physical wires. However, phases can be switches and routed dynamically, so maintaining a GIS representation of independent physical wires is too cumbersome and confusing.

FIG. 54 shows a "loop" on the right-hand side, consisting of arcs i, k, j, l, and m. Such loops are common in underground electrical utilities and in water and gas utilities. Most traditional tree representations of multi-phase electric distribution networks have trouble with these loops, usually requiring artificial constructions to break the loop.

FIG. 55 is a representation of the type of information stored in the protective devices table. Depending on how the utility company chooses to model its system, which may be all single-phase devices. Switches are often "ganged" together to make them operated on multiple phases at once.

FIG. 56 is a simplified representation of a customer table, where each customer "knows" which conductor arc is feeding power to it.

Figure 57:
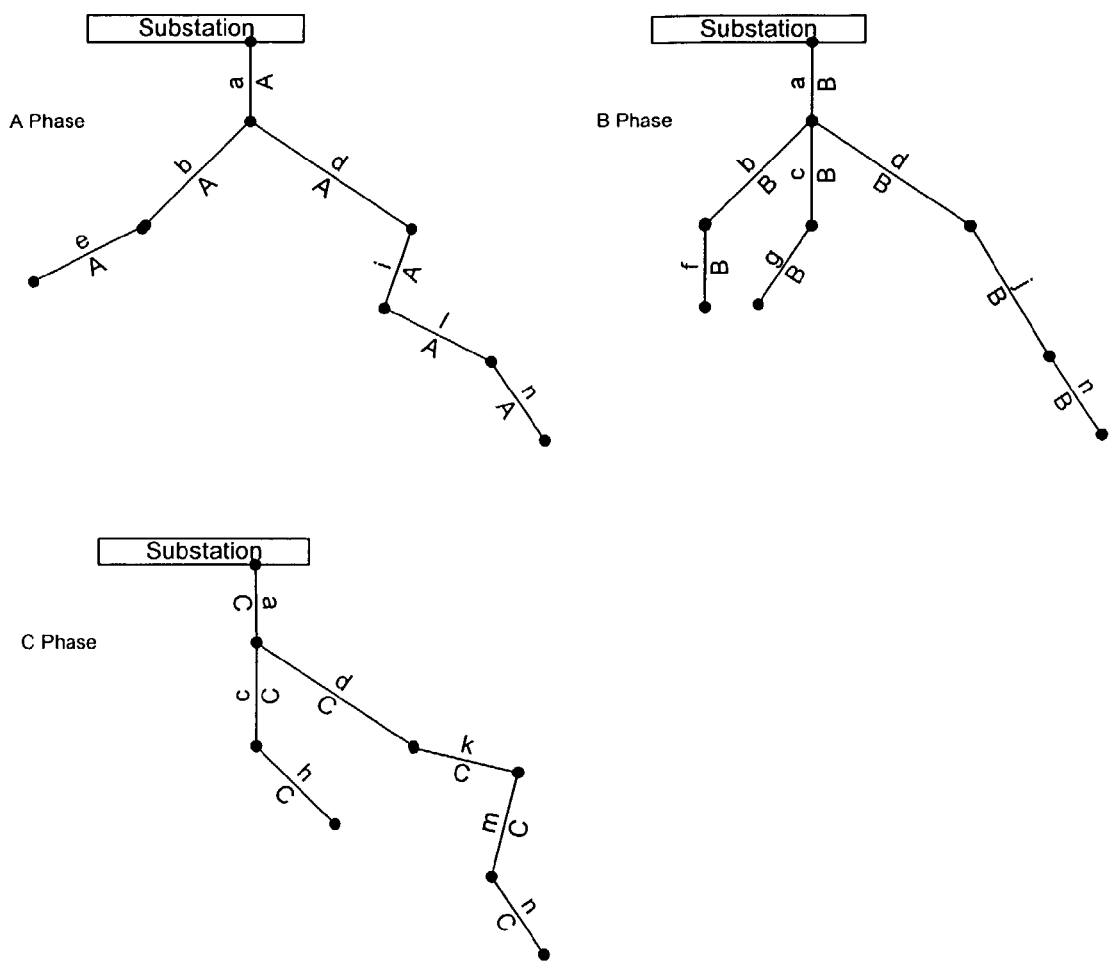
FIG. 57 shows the decomposition of the network in FIG. 54 by phase.

The UtilityCenter™ 10 begins the construction of the trace caches by traversing the network down from each source arc (the first arc leaving a power source) by phase. FIG. 57 shows the decomposition of the network in FIG. 54 by phase to illustrate how the three networks stack on top of each other (protective devices and customers are omitted from this diagram).

Figure 58:
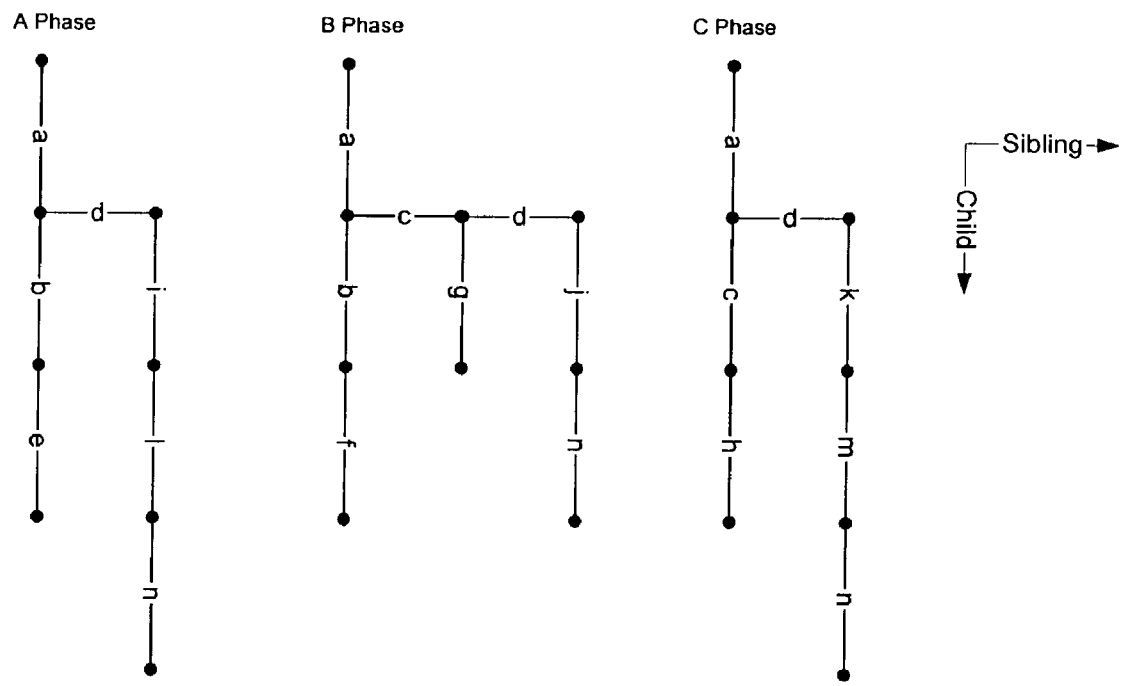
FIG. 58 shows the equivalent binary tree representations of the networks of FIG. 57.

Each by-phase decomposition of the electrical network is a dendritic network that can be represented in computer data structures by an n-Tree. For example, the "B Phase" network in FIG. 57 has three paths leading from arc a. To facilitate traversal and searching, this must be converted to a binary tree. To do this, the leftmost child of a given arc becomes the leftmost child arc in the binary tree. Any other children of the given node become "sibling" nodes, stored in the right hand path(s) of the binary tree. FIG. 58 shows the equivalent binary tree representations of the by phase networks of FIG. 57.

A logical representation of the trace cache is shown in FIG. 59. This is a tabular form of a complex data structure, where each arc participates in three doubly-linked binary trees. As the cache is being built, the source arc and protective devices, by phase, are "carried along" and stored directly in the trace cache. This trace cache can be represented in many different ways in computer memory, e.g., an array, a linked list of structures, or a database recordset.

As an example of how the cache is used to predict and manage outages, if customer C4 calls, the system assumes a "transformer outage" with only C4 as the affected customer. If customer C2 then calls in, since they are both A phase, their common upline protective device is the A phase of the recloser at D2. The transformer outage containing customer C4 is grown to a device outage affecting C2 and C4. If customer C7 calls in, the outage would grow to the SBS (Substation Breaker Switch) at D1 affecting all A phase customers downstream of arc a (C2, C4, C7, and C10). Through this, customer C4 is only recorded as being out of power once, even though the outage involving C4 has grown twice since the original call.

User settable thresholds can be established for how many downline customer calls are required to grow an outage to include an upstream device, under what conditions two isolated outages are merged to a single outage, or under what conditions a single outage may be decomposed into multiple outages (usually based on on-site inspection of predicted devices).

The cache is also used for quickly tracing the network, upstream or down. The results of these traces can be shown graphically (e.g., trace up from a customer to see which substation they are being fed from) or as data to be joined to other operations (e.g., trace down from this switch and provide a report of customers fed by the line).

This is different from Pat. '399 in that (a) the modeling of three phase systems being in a single line network; (b) the building of the cache eliminates the need for upline tracing and searching; and (c) the ability for the end-user to customize the prediction thresholds.

Existing Mapping and Asset Data Consolidation

The above-mentioned modules can be selectively bundled to satisfy one utility company's specific needs. Customer purchases the UtilityCenter solution and decides which modules they will require. The existing mapping and asset data of the utility company will be consolidated into the GIS 900 by converting the existing data (in GIS, CAD, or paper map formats) to UtilityCenter™ 10's formats. This involves not only importing the raw data, but adding the UtilityCenter™ 10's system fields and establishing all network connectivities. Also, external data interfaces have to be established. If necessary, development can proceed on these interfaces concurrent with the data conversion. Once the data has been converted to the appropriate format, tests will be conducted on the converted data. Meanwhile, data views, reports, information tables, data domains, work order header schemas, etc are established.

Typically, a pilot installation is done where the utility company can use the UtilityCenter™ 10 concurrently with its existing processes for some amount of time. This is usually done with a subset of the utility company's data. If the condition of the data is satisfactory, the system is then installed to the utility company's server, following up with staff training.

Two Versions of UtilityCenter™

The first version of the UtilityCenter™ was available in the market since 1998, which contained many features absent form the prior art. The second version of the UtilityCenter™ improves some features of the first vision significantly and add new features as follows. The second version's improved features over the first version include Prediction Engine, Work Flow Management, Web Products 1500, Replication Strategy, Database to Shapefile sync, GIS based crew management, Switching, switch tagging, and switching model simulation.

The second version's Prediction/Trace engine predicts electrical outages much faster. By integrating domain specific data (upline devices, switching, feeder info) into our trace cache, the system predict outages based on customer calls, automatic meter readings, or SCADA devices without lengthy traces or database queries. In the first version, no trace cache was built—all tracing and outage prediction was done by searching for connected nodes in the arc tables. Other applications, such as ArcMap, do built caches as part of their network construction, but none build "domain specific" knowledge into the cache. For electrical networks, this includes the phase information, upline devices, source arcs, etc. In actual practice, our cache is more complex than the one shown (incorporating switching, bit flags for state (normally open, abnormally open, normally closed, abnormally closed), flags that are using during trace operations, etc. The overall "effect" of this process is similar to the one in the first version, but the power and speed have increased 10-fold by the trace caches. Preprocessing of the network data (to build indexes, instead of a trace cache), took approximately 10 seconds for a network of ~100,000 arcs and ~50,000 customers in the first version, and an upline search (of which a dozen or more may be required to predict and manage a single outage) took a little over 1 second. The trace cache of the second version for the same data builds in less than 1 second and retrieving all of the information needed to create, grow, merge, or shrink a single outage takes around 150 ms.

The second version combines a simple and effective method for managing GIS edits through the three categories of the interfaces with a very flexible, user extensible, model for adapting the work flow to any utility or business model. As such, the second version delivers a customer's entire database (GIS and tabular) to every worker in the field in a completely editable form, which is a key technology that enables field portability and speed. Greatly improved over the first version (including AVL mentioned above). The second version allows for "what if" scenarios, or actual switching orders. Switching orders are "tagged" for safety and historical analysis.

The Switching Module has been greatly improved in the second version. The first version provided for basic switching where the user could select the device to switch, add it to a switching list and execute the list (in its entirety). However, in the second version, the user can save Switching lists in a Library to be used at a later date. In addition, a switching list can be modified to add/delete an item, tasks can be added to the switching list as can tag items, and items on the switching list can be executed a step at a time. Rather than executing, the user can perform simulation where 'what if' scenarios can be run, as opposed to live execution and then seeing the results.

The first version did not work on DBD Settings in its entirety, but only partially looked at these settings. On the other hand, the second version is totally driven by DBD Settings for editable, viewable, searchable, dropdowns, required fields etc. The first version allowed a user to grow an Outage, but it automatically selected the first up-line device from the starting arc of the Outage being grown. In the second version, a list of up-line devices is returned and the user selects the device that they wish to grow the selected Outage to. The customer can also determine what information gets transferred to the new Outage as well (if merging with other Outages), while in 1.x this was arbitrary. In the first version, when Closing an Outage, all required fields must be completed, or the user cannot close the outage, same with a trouble call. The user can set symbology for Outages, Trouble Calls, Crews, Affected Customers, and Callbacks in the second version, which could only be partially done in the first version.

The first version allowed a user to Split an Outage, but it automatically determined how that split would happen. In the second version, a List of downstream devices is provided to the user, and the user selects which, if any, devices the Outages should 'Split back' too. Also, in the first version, the Crews that were associated with the Old Outage would automatically get assigned/put at site on the first split Outage that was created, while in the second version, the user can select which Outage(s) to move these crews to.

The second version expands a concept of generating a work order from an Outage of the first version. In the second version, the user can map which fields should be moved from the Outage to the Work order template, and also which Work order template should be associated with a certain type of Outage.

The Crew Management of the first version was basic. It allowed the user to enter a crew name, type, contact information, and be assigned to an Outage and that was about it. In the second version, a user can build a crew to include the following: Crew Members, Equipment, Material, Work order Assignments, Outage Assignments, Crew Current Physical Locations, and Skill Sets. As such, Work and Service Orders can be assigned and scheduled to be worked, skill sets of Crews and individual Crew members, as well as the Equipment and Material associated with a specific Crew can be tracked.

The second version includes new features not available in the first version, such as Sketch and sketch manager, Multiple work order types, MasterSQL, Security Manager, Custom Edit and Custom Report interfaces, AVL Interfaces, Transfer database for $3^{rd}$ party data, and a new feature of the Prediction/Trace engine, i.e., ability to process Calls by District. The new Security Manager allows user administrators to allow/deny access to functionality within the application, to set permissions for who can view/edit certain database tables, or to set permissions for who can view/edit particular fields within a database table. These security setting can be set per user, or users can be assigned to groups with preset security sets. The system architecture allows managers or administrators to temporarily assign permissions to work crews. For example, a contractor hired to do fire hydrant inspections could be given a laptop with UtilityCenter loaded on it and assigned a username that only allows him to edit and view the inspection fields on the HYDRANT theme.

The ability to process Calls by District in the second version allows the utility company to have multiple instances of the uaPE 1480 running, which in effect should boost performance numbers. Also, the uaPE 1480 processes non-Electric Trouble Calls.

In the second version, the user can make callbacks within the application. Also, introduced the concept of Smart list, where the user, when generating a callback list can do so by device and depth from the Starting arc of the Outage. For example the user can say I want to generate a callback list of 5 customers that are the farthest away (greatest depth) from each protective device that is in the Outage.

In the second version, the status of an Outage can have a voice message associated with it. Each individual Outage can use this voice message or have an original one recorded that can then be moved to the IVR for playback. Also, voice messages from a caller can be moved to a Trouble call and played in the second version.

As mention, Sketch and sketch manager are a set of drawing tools that allow the user to draw ad hoc graphics on top of the GIS 900. These sketches can be assigned categories, turned on or off, or associated with a work order.

Multiple work order types are not just defined by the system "up front," but by the utility company users later via an interface to create Excel reports that link and update data in these work order headers to do things like formula based cost estimations and summaries.

The first version simply could not search on an Outage/trouble call which has been introduced in the second version. Drawing Callbacks is only available in the second version. In the second version, the user can add/remove fields to any of the base OMS Tables and the system will pick this up. Excepts some reserved fields, the user can add/remove those fields as they would like in the second version, which could not be done in the first version.

All SQL queries the system is based on are contained in a metadata table MasterSQL so as to be modified without code changes. Users can extend this table for custom reports. It also allows the system to provide database independent versions without code changes.

Custom Edit and Custom Report interfaces are provided for adding new functionality to the system. Vendor independent interfaces that integrate $3^{rd}$ party vehicle location data with real-time display within the application are provided. For example, any AVL company can provide users with a standalone display of vehicle locations displayed on top of maps. The system allows the customer to use several different company's AVL data to display their vehicles inside our application and to be able to click on a vehicle to show the crew on that vehicle, what equipment they are carrying, what their work assignments are, or to send them messages or new work data. A neutral interface layer, which is a standard part of the UAI Datasets contained in block 900 of FIG. 2, is provided for interfaces so as to transfer database for $3^{rd}$ party data.

Partial Restoration has been introduced into the second version. It essentially works like a split. As the Outage is partially restored all Child Outages (Split Outages) are stamped with the Prikey of the Parent Outage, and Flagged as part of a partially restored Outage. The Original Partially Restored Outage data is moved to Historical database, as will the child Outages of that Partially Restored Outage. Affected Customers, Trouble calls of the Original Outage, get re-associated with the Child Outages. This means that the affected customers, Trouble calls are ever only associated with one Outage, which reduces the frequency for reliability indices.

Monitoring Crews by District has been introduced in to the second version, as well as some smart features like: Smart list of Crews, where only crews that are in the same district as the Outage will be returned for assignment, Smart list of Crews, where only crews that are in a specific search radius will be returned for assignment, and Smart list of Crews, where only crews that are of a specific type will be returned for Assignment.

Besides electric transmission and distribution utilities, the same technology has been tailored to the specific needs of public agencies, such as fire and police departments, zoning and planning commissions, public transportation departments and others can benefit from instant access to accurate mapping information, such as gas pipeline and distribution utilities, water distribution utilities & wastewater utilities, broadband telecom providers, real property tax assessment, municipal zoning and planning, Department of Defense military applications, EMA emergency management applications, Department of Energy utility applications, and other local, state and federal governmental agencies. Specific software application suites, such as CityCenter™ (Emergency 9-1-1, fire & police, zoning/planning, public work), CountyCenter™ (EMA, highway dept., EPA), and GlobalCenter™ (homeland security housing, energy, interior), have been developed accordingly.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A computer-implemented method for integrating and providing utility management information of an utility distribution system based upon data from a geographic information systems (GIS) database and data sources including a customer information data, billing data, interactive voice recognition (IVR) call management data, supervisory control and data acquisition (SCADA) data, mobile crew management (MCM) data, automatic meter reading (AMR) data, automated vehicle location (AVL) data, engineering analysis data supported by $3^{rd}$ party software packages, said computer-implemented method comprising:

importing and synchronizing said data from the GIS database and said sources so as to support on-demand queries for the utility management information, said importing-accomplished with a computer system, displaying locations of vehicles based upon the AVL data, said displaying accomplished with a display of said computer system, and executing, with said computer system, processes of:

(I) mapping parent outages of an electric distribution network of the utility distribution system in an electronic model map, determining a protective device nearest to one of the parent outages which was incorrectly predicted, splitting said one parent outage into one or more child outages, associating the child outages with said one parent outage, restoring one of the child outages thereby partially restoring at least one parent outage, automatically re-associating the restored child outage with the partially-restored parent outage, deleting said one parent outage from the map without entering said one parent outage in a historical outage log, counting said one parent outage and said one child outage only as one outage and associating affected customers and trouble calls in connection only with said one counted outage thereby automatically reducing an outage frequency which reflects system reliability, and (II) decomposing the electric distribution network by phase into three single-phase electrical networks respectively represented in said computer system in the form of a searchable binary tree for each of the single-phase electrical networks, storing data of each of the three single-phase electrical networks in a cache memory of the utility distribution system, and displaying the electric distribution network on said display in a graphical user interface of said computer system as a logical overlay of the three single-phase electrical networks containing logical associations to single-line GIS representations of conductors, each of the single-line GIS representations of conductors including one line segment labeled only with a conductor ID and at least one phase attribute to reflect corresponding physical geometry of the electric distribution network, displaying secondary service lines between the conductors and customers extending from said line segments, displaying in-line protective devices on top of said line segment representing a conductor protected by the in-line protective devices, and processing and predicting outages by phase based upon stored data of the three single-phase electrical networks, said customers, and said in-line protective devices without tracing phase attribute data corresponding to said single-line GIS representations of conductors.

2. The computer-implemented method according to claim 1, further comprising at least one step of:
modifying an outage or switching model, editing underlying data of said model based upon the on-demand queries.

3. The computer-implemented method according to claim 1, wherein the (I) process further performs growing, additional splitting, combining, or shrinking outages based upon the on-demand queries.

4. The computer-implemented method according to claim 1, a step of maintaining historical information to generate reliability indices.

5. The computer-implemented method according to claim 1, further comprising a step of historical outage tracking.

6. The computer-implemented method according to claim 1, further comprising a step of transmitting the on-demand queries via internet, intranet, or wirelessly from a remote site.

7. The computer-implemented method according to claim 1, further comprising a step of tracking work flow by collecting data modifications, job details, and graphical sketches.

8. The computer-implemented method according to claim 1, further comprising a step of predicting outage based the IVR call management data, the AMR data, or the SCADA data.

9. The computer-implemented method according to claim 1, further comprising a step of generating a customer callback list based upon an outage or a switching operation.

10. The computer-implemented method according to claim 1, further comprising a step of associating an outage with at least one voice message.

11. The computer-implemented method according to claim 1, further comprising a step of providing a point-and-click interface to at least one authorized user to assign and control tools and data access of other users to access the tools or data necessary for performing the users' daily work.

12. The computer-implemented method according to claim 1, further comprising a step of searching for a trouble call.

13. The computer-implemented method according to claim 1, further comprising a step of displaying locations of customers to receive a call back in a GIS graphic based upon a Callback list.

14. The computer-implemented method according to claim 1, further comprising a step of displaying the IVR call management data, the SCADA data, the MCM data, the AMR data, the AVL data, the engineering analysis data in a GIS graphic.

15. The computer-implemented method according to claim 1, further comprising a step of managing crews by district.

16. The computer-implemented method according to claim 1, further comprising a step of making speculative changes or permanent changes to data from the data sources imported to a work order and saving into a plurality of versions of the work order so as to simultaneously display selected versions by a user thereby allowing the user to analyze displayed versions.

17. The computer-implemented method according to claim 1, further comprising a step of building a crew by Crew Members, Equipment, Materials, Work order Assignments, Outage Assignments, Crew Current Physical Locations, and Skill Sets.

18. The computer-implemented method according to claim 1, further comprising a step of processing the IVR call management data, the supervisory control and data acquisition (SCADA) data, the mobile crew management (MCM) data, the automatic meter reading (AMR) data, and the automated vehicle location (AVL) data by any selected combination of districts.

19. The computer-implemented method according to claim 1, further comprising a step of sketching ad hoc graphics on top of a GIS graphic so as to associate a sketch with a work order.

20. The computer-implemented method according to claim 1, further comprising a step of defining work order types associated with outage types by a user thereby linking and updating outage data therein in work order headers.

21. The computer-implemented method according to claim 1, further comprising a step of automatically integrating the AVL data with other data.

22. A tangible computer readable storage medium comprising computer executable instructions tangibly embodied thereon which, when executed, cause a processor of a computer system to perform a method for integrating and providing utility management information for an utility distribution system based upon data from a geographic information systems (GIS) database and data sources including a customer information data, billing data, interactive voice recognition (IVR) call management data, supervisory control and data acquisition (SCADA) data, mobile crew management (MCM) data, automatic meter reading (AMR) data, automated vehicle location (AVL) data, engineering analysis data supported by $3^{rd}$ party software packages, the method comprising:
importing and synchronizing said data from the GIS database and said data sources so as to support on-demand queries for the utility management information, said importing accomplished with a computer system,
displaying near-real-time locations of vehicles based upon the AVL data, said displaying accomplished with a display of said computer system, and
decomposing the electric distribution network by phase into three single-phase electrical networks respectively represented in said computer system in the form of a searchable binary tree for each of the single-phase electrical networks, storing data of each of the three single-phase electrical networks in a cache memory of the utility distribution system, and displaying the electric distribution network on said display in a graphical user interface of said computer system as a logical overlay of the three single-phase electrical networks containing logical associations to single-line GIS representations of conductors, each of the single-line GIS representations of conductors including one line segment labeled only with a conductor ID and at least one phase attribute to reflect corresponding physical geometry of the electric distribution network, displaying secondary service lines between the conductors and customers extending from said line segments, displaying in-line protective devices on top of said line segment representing a conductor protected by the in-line protective devices, and processing and predicting outages by phase based upon stored data of the three single-phase electrical networks, said customers, and said in-line protective devices without tracing phase attribute data corresponding to said single-line GIS representations of conductors.

23. A tangible computer readable storage medium comprising computer executable instructions tangibly embodied thereon which, when executed, cause a processor of a computer system to perform a method for integrating and providing utility management information for an utility distribution system based upon data from a geographic information systems (GIS) database and data sources including a customer information data, billing data, interactive voice recognition (IVR) call management data, supervisory control and data acquisition (SCADA) data, mobile crew management (MCM) data, automatic meter reading (AMR) data, automated vehicle location (AVL) data, engineering analysis data supported by 3'* party software packages, the method comprising:

importing and synchronizing said data from the GIS database and said data sources so as to support on-demand queries for the utility management information, said importing accomplished ith a computer system, displaying on the computers rear-real-time locations of vehicles based upon the AVL data, said displaying accomplished with a display of said computer system, and executing, with said computer system, processes of:

(I) mapping parent outages of an electric distribution network of the utility distribution system in an electronic model map, finding a protective device nearest to one of the parent outages which was incorrectly predicted, splitting said one parent outage into one or more child outages, associating the child outages with said one parent outage, restoring one of the child outages thereby partially restoring said one parent outage, automatically re-associating the restored child outage with the partially-restored parent outage, deleting said one parent outage from the map without entering said one parent outage in a historical outage log, counting said one parent outage and said one child outage only as one outage and associating affected customers and trouble calls in connection only with said one counted outage thereby automatically reducing an outage frequency which reflects system reliability, and (II) decomposing the electric distribution network by phase into three single-phase electrical networks respectively represented in said computer system in the form of a searchable binary tree for each of the single-phase electrical networks, storing data of each of the three single-phase electrical networks in a cache memory of the utility distribution system, and displaying on said display in a graphical user interface of said computer system the electric distribution network as a logical overlay of the three single-phase electrical networks containing logical associations to single-line GIS representations of conductors, each of the single-line GIS representations of conductors including one line segment labeled only with a conductor ID and at least one phase attribute to reflect corresponding physical geometry of the electric distribution network, displaying secondary service lines between the conductors and customers extending from said line segments, displaying in-line protective devices on top of said line segment representing a conductor protected by the in-line protective devices, and processing and predicting outages by phase based upon stored data of the three single-phase electrical networks, said customers, and said in-line protective devices without tracing phase attribute data corresponding to said single-line GIS representations of conductors.

24. The tangible computer readable storage medium according to claim 23, wherein said method further comprises computer executable instructions for setting:

a threshold for how many downline customer calls are required to grow an outage to include an upstream device, a set of conditions under which two isolated outages are to merge to a single outage, and a set of conditions under which a single outage is to be decomposed into multiple outages.

* * * * *

UNITED STATES PATENT AND TRADEMARK OFFICE
CERTIFICATE OF CORRECTION

| | | |
|---|---|---|
| PATENT NO. | : 7,739,138 B2 | |
| APPLICATION NO. | : 10/440089 | |
| DATED | : June 15, 2010 | |
| INVENTOR(S) | : Swatantar K. Chauhan et al. | |

It is certified that error appears in the above-identified patent and that said Letters Patent is hereby corrected as shown below:

Col. 35, Line 27, Claim 23: Delete "3'*"
and insert -- 3rd --

Col. 35, Line 32, Claim 23: Delete "ith"
and insert -- with --

Signed and Sealed this
Fifth Day of April, 2011

David J. Kappos
*Director of the United States Patent and Trademark Office*